(12) United States Patent
Miller et al.

(10) Patent No.: US 11,736,579 B1
(45) Date of Patent: Aug. 22, 2023

(54) TECHNIQUES FOR RESOURCE DISCOVERY

(71) Applicant: Oracle International Corporation, Redwood Shores, CA (US)

(72) Inventors: Erik Joseph Miller, Seattle, WA (US); Caleb Dockter, Bellevue, WA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 18/078,883

(22) Filed: Dec. 9, 2022

Related U.S. Application Data

(60) Provisional application No. 63/315,043, filed on Feb. 28, 2022, provisional application No. 63/312,814, filed on Feb. 22, 2022, provisional application No. 63/308,003, filed on Feb. 8, 2022.

(51) Int. Cl.
*H04L 67/51* (2022.01)

(52) U.S. Cl.
CPC ................................. *H04L 67/51* (2022.05)

(58) Field of Classification Search
CPC ......................................................... H04L 67/51
USPC ............................................................. 709/226
See application file for complete search history.

(56) References Cited

U.S. PATENT DOCUMENTS

| 11,265,292 B1* | 3/2022 | Leviseur | H04L 63/0263 |
| 2014/0149591 A1* | 5/2014 | Bhattacharya | G06F 9/5072 709/226 |
| 2021/0203731 A1* | 7/2021 | Garty | H04L 41/0853 |
| 2021/0326035 A1* | 10/2021 | Jia | G06N 20/00 |
| 2023/0075183 A1* | 3/2023 | Copty | G06N 20/00 |

* cited by examiner

*Primary Examiner* — Wing F Chan
*Assistant Examiner* — Leon Y Tseng
(74) *Attorney, Agent, or Firm* — Kilpatrick Townsend & Stockton LLP

(57) ABSTRACT

Techniques are described for identifying resources within a region of a cloud-computing environment. A Resource Identification Service (RIS) may be configured to obtain a flock configuration file comprising resource discovery data associated with a service. The resource discovery data may indicate a set of parameters with which a previously existing resource of the cloud-computing environment is to be identified. RIS may execute operations to identify the previously existing resource based at least in part on matching attributes associated with previously existing resource to the set of parameters of the resource discovery data. The RIS may identify, from the flock configuration file, a set of import operations to perform to obtain an identifier corresponding to the previously existing resource. The identifier may be provided to cause the previously existing resource to be utilized in a region build.

20 Claims, 15 Drawing Sheets

TECHNIQUES FOR RESOURCE DISCOVERY

CROSS-REFERENCE TO RELATED APPLICATIONS

This non-provisional application claims priority to U.S. Provisional Patent Application No. 63/308,003, filed on Feb. 8, 2022, entitled "Techniques for Bootstrapping a Region Build," U.S. Provisional Patent Application No. 63/312,814, filed on Feb. 22, 2022, entitled "Techniques for Implementing Virtual Data Centers," and U.S. Provisional Patent Application No. 63/315,043, filed on Feb. 28, 2022, entitled "Techniques for Resource Discovery," the disclosures of which are herein incorporated by reference in their entirety for all purposes.

BACKGROUND

Today, cloud infrastructure services utilize many individual services to build a data center (e.g., to bootstrap various resources in a data center of a particular geographic region). In some examples, a region is a logical abstraction corresponding to a localized geographical area in which one or more data centers are (or are to be) located. Building a data center may include provisioning and configuring infrastructure resources and deploying code to those resources (e.g., for a variety of services). The operations for building a data center may be collectively referred to as performing a "region build." Any suitable number of data centers may be included in a region and therefore a region build may include operations for building multiple data centers. Conventional tools for building a data center require significant manual effort. Additionally, bootstrapping operations for one service may depend on other functionality and/or services of the region which may not yet be available. As the number of service teams and regions grows, the tasks performed for orchestrating provisioning and deployment drastically increase. Substantially relying on manual efforts for bootstrapping services and/or building data centers is time intensive, incurs risks, and may not scale well.

BRIEF SUMMARY

Embodiments of the present disclosure relate to a Resource Identification Service (e.g., a "Resource Hunter") that is configured to identify previously existing resources (e.g., infrastructure component, artifacts, data etc.) that can be used to bootstrap a service in a region in lieu of creating a new resource. An orchestration service (e.g., a Multi-Flock Orchestrator) is disclosed that may orchestrate a region build process to bootstrap many services in a region. As part of the region build process, Multi-Flock Orchestrator can utilize the Resource Identification Service to identify previously existing resources and orchestrate bootstrapping operations such that the identified resources are utilized for bootstrapping operations in lieu of creating new resources.

At least one embodiment is directed to a computer-implemented method. The method may include obtaining, by a resource identification service of a cloud computing environment, a flock configuration file comprising resource discovery data associated with a service. In some embodiments, the resource discovery data indicates a set of parameters with which a previously existing resource of the cloud computing environment is to be identified. The method may further include executing, by the resource identification service, operations to identify the previously existing resource. In some embodiments, the previously existing resource may be identified based at least in part on matching attributes associated with each of the previously existing resource to the set of parameters of the resource discovery data. The method may further include identifying, by the resource identification service from the flock configuration file, a set of import operations to perform to store identifiers corresponding to the previously existing resource identified. The method may further include transmitting the identifier corresponding to the previously existing resource identified based at least in part on executing the set of import operations.

In at least one embodiment, the set of parameters comprises at least one of: a location to be searched for the previously existing resource or a value corresponding to an attribute of the previously existing resource.

In at least one embodiment, the identifier corresponding to the previously existing resource is transmitted to an orchestration service of the cloud-computing environment. In some embodiments, transmitting the identifier to the orchestration service of the cloud-computing environment causes the previously existing resource to be utilized in a data center in lieu of generating a new resource.

In at least one embodiment, the previously existing resource includes at least one of: an infrastructure component, data, or an application.

In at least one embodiment, the set of import operations are identified from the configuration file.

In at least one embodiment, the method further comprises: i) obtaining, by the resource identification service from the resource discovery data, a second set of parameters with which a second previously existing resource of the cloud-computing environment is to be identified, ii) executing, by the resource identification service, additional operations to identify the second previously existing resource, the second previously existing resource being identified based at least in part on matching attributes associated with the second previously existing resource to the second set of parameters of the resource discovery data, iii) identifying, by the resource identification service, a second set of import operations to perform to obtain a second identifier corresponding to the second previously existing resource, iv) providing, to a computing component, the second identifier corresponding to the second previously existing resource identified based at least in part on executing the second set of import operations.

In at least one embodiment, the method further comprises executing the set of import operations, wherein executing the set of import operations causes the resource identification service to identify an address corresponding to a location of the previously existing resource or the identifier for the previously existing resource.

Another embodiment is directed to a cloud-computing system comprising one or more processors and instructions that, when executed by the one or more processors, cause an resource identification service to perform any suitable combination of the method(s) disclosed herein.

Still another embodiment is directed to a non-transitory computer-readable medium storing computer-executable instructions that, when executed by one or more processors of a cloud-computing system, cause a resource identification service to perform any suitable combination of the method(s) disclosed herein.

At least one embodiment is directed to a computer-implemented method. The method may include obtaining, by a multi-flock orchestrator of a cloud-computing environment, a plurality of flock configuration files corresponding to a plurality of services to be bootstrapped within a region during a region build process. The method may further include determining, by the multi-flock orchestrator, an order by which the plurality of services are to be bootstrapped within the region based at least in part on the plurality of flock configuration files. The method may further include transmitting, by the multi-flock orchestrator, a first request to bootstrap a service of the plurality of services. The method may further include receiving, by the multi-flock orchestrator based at least in part on transmitting the first request, planning data indicating a resource to be created for bootstrapping the service. The method may further include obtaining, by the multi-flock orchestrator from a resource identification service, an identifier corresponding to a previously created resource of the cloud-computing environment. The method may further include modifying, by the multi-flock orchestrator, the planning data to include the identifier corresponding to the previously created resource of the cloud-computing environment. The method may further include transmitting, by the multi-flock orchestrator, a second request to bootstrap the service, the second request comprising the planning data including the identifier corresponding to the previously created resource, the provisioning and deployment manager utilizing the identifier corresponding to the previously created resource to cause the service to be bootstrapped within the region using the previously created resource.

In some embodiments, the second request is transmitted to a provisioning and deployment service of the cloud computing environment.

In some embodiments, the method further comprises validating the planning data as modified to include the identifier.

In some embodiments, validating the planning data comprises i) transmitting a third request comprising the planning data as modified to include the identifier, ii) receiving, in response to the third request, updated planning data, and iii) comparing the updated planning data to the planning data as modified to include the identifier, wherein validating the planning data is determined based at least in part on comparing the updated planning data to the planning data as modified.

In some embodiments, obtaining, from the resource identification service, the identifier corresponding to the previously created resource of the cloud computing environment further comprises transmitting, by the orchestration service to the resource identification service, a configuration file of the plurality of configuration files, the configuration file being associated with the service of the plurality of services, wherein the resource identification service identifies the previously created resource based at least in part on data included in the configuration file.

In some embodiments, the method further comprises implementing a state machine for managing transitions between a plurality of states, wherein at least one of: determining the order by which the plurality of services are to be bootstrapped to the data center, transmitting the first request, obtaining the identifier corresponding to the previously created resource, modifying the planning data, or transmitting the second request, is performed based at least in part on identifying the state machine is in a particular state of the plurality of states.

In some embodiments, the method further comprises transitioning, by the orchestration service, the state machine from a first state to a second state of the plurality of states based at least in part on one or more messages received from a capabilities service or the resource identification service.

Another embodiment is directed to a cloud-computing system comprising one or more processors and instructions that, when executed by the one or more processors, cause an orchestration service to perform any suitable combination of the method(s) disclosed herein.

Still another embodiment is directed to a non-transitory computer-readable medium storing computer-executable instructions that, when executed by one or more processors of a cloud-computing system, cause an orchestration service to perform any suitable combination of the method(s) disclosed herein.

BRIEF DESCRIPTION OF THE DRAWINGS

To easily identify the discussion of any particular element or act, the most significant digit or digits in a reference number refer to the figure number in which that element is first introduced.

DETAILED DESCRIPTION

Figure 1:
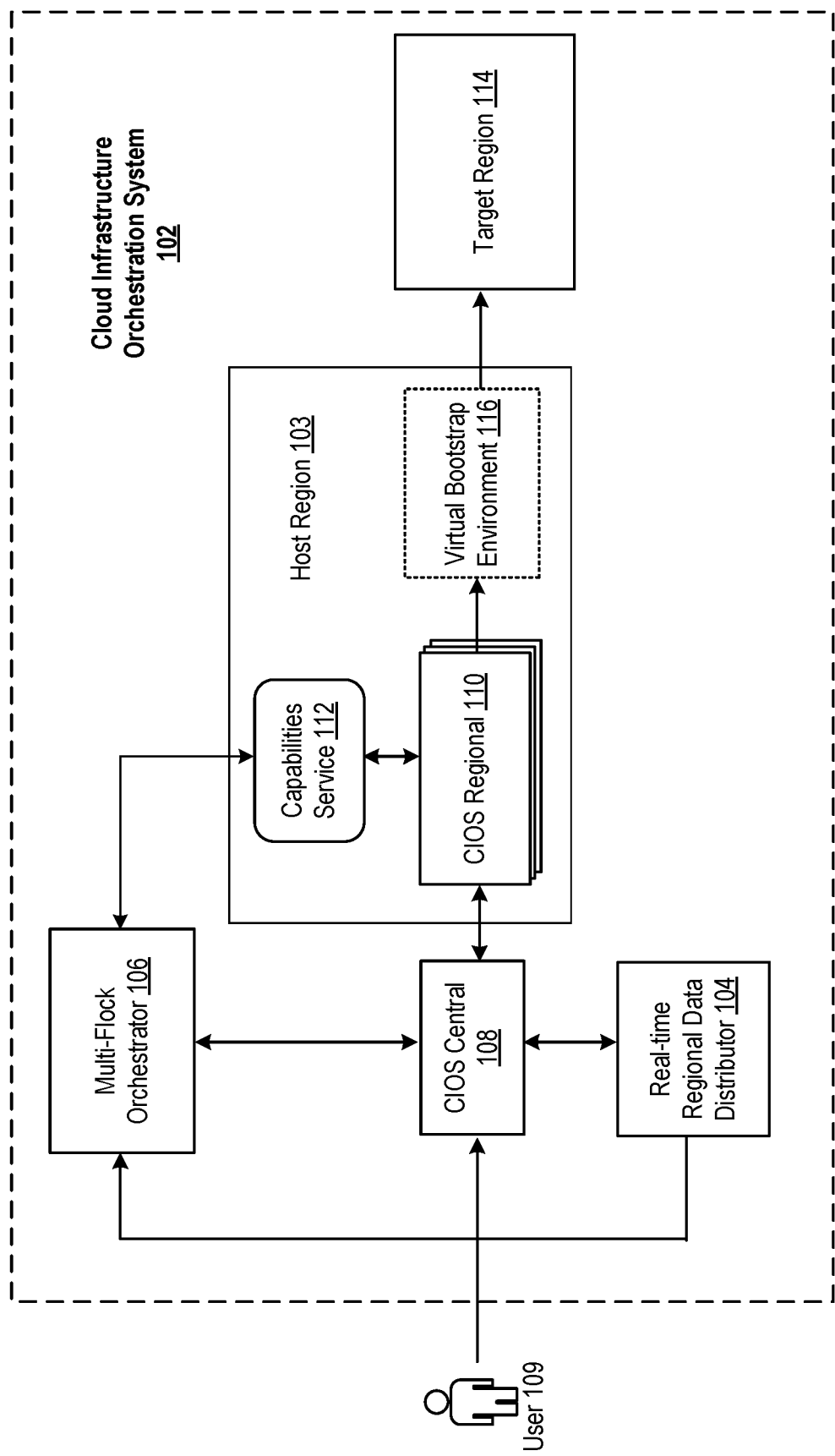
FIG. 1 is a block diagram of an environment in which a Cloud Infrastructure Orchestration Service (CIOS) may operate to dynamically provide bootstrap services in a region, according to at least one embodiment.

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

Example Automated Data Center Build (Region Build) Infrastructure

The adoption of cloud services has seen a rapid uptick in recent times. Various types of cloud services are now provided by various different cloud service providers (CSPs). The term cloud service is generally used to refer to a service or functionality that is made available by a CSP to users or customers on demand (e.g., via a subscription model) using systems and infrastructure (cloud infrastructure) provided by the CSP. Typically, the servers and systems that make up the CSP's infrastructure and which is used to provide a cloud service to a customer are separate from the customer's own on-premise servers and systems. Customers can thus avail themselves of cloud services provided by the CSP without having to purchase separate hardware and software resources for the services. Cloud services are designed to provide a subscribing customer easy, scalable, and on-demand access to applications and computing resources without the customer having to invest in procuring the infrastructure that is used for providing the services or functions. Various different types or models of cloud services may be offered such as Software-as-a-Service (SaaS), Platform-as-a-Service (PaaS), Infrastructure-as-a-Service (IaaS), and others. A customer can subscribe to one or more cloud services provided by a CSP. The customer can be any entity such as an individual, an organization, an enterprise, and the like.

As indicated above, a CSP is responsible for providing the infrastructure and resources that are used for providing cloud services to subscribing customers. The resources provided by the CSP can include both hardware and software resources. These resources can include, for example, compute resources (e.g., virtual machines, containers, applications, processors), memory resources (e.g., databases, data stores), networking resources (e.g., routers, host machines, load balancers), identity, and other resources. In certain implementations, the resources provided by a CSP for providing a set of cloud services CSP are organized into data centers. A data center may be configured to provide a particular set of cloud services. The CSP is responsible for equipping the data center with infrastructure and resources that are used to provide that particular set of cloud services. A CSP may build one or more data centers.

Data centers provided by a CSP may be hosted in different regions. A region is a localized geographic area and may be identified by a region name. Regions are generally independent of each other and can be separated by vast distances, such as across countries or even continents. Regions are grouped into realms. Examples of regions for a CSP may include US West, US East, Australia East, Australia Southeast, and the like.

A region can include one or more data centers, where the data centers are located within a certain geographic area corresponding to the region. As an example, the data centers in a region may be located in a city within that region. For example, for a particular CSP, data centers in the US West region may be located in San Jose, Calif.; data centers in the US East region may be located in Ashburn, Va.; data centers in the Australia East region may be located in Sydney, Australia; data centers in the Australia Southeast region may be located in Melbourne, Australia; and the like.

Data centers within a region may be organized into one or more availability domains, which are used for high availability and disaster recovery purposes. An availability domain can include one or more data centers within a region. Availability domains within a region are isolated from each other, fault tolerant, and are architected in such a way that data centers in multiple availability domains are very unlikely to fail simultaneously. For example, the availability domains within a region may be structured in a manner such that a failure at one availability domain within the region is unlikely to impact the availability of data centers in other availability domains within the same region.

When a customer or subscriber subscribes to or signs up for one or more services provided by a CSP, the CSP creates a tenancy for the customer. The tenancy is like an account that is created for the customer. In certain implementations, a tenancy for a customer exists in a single realm and can access all regions that belong to that realm. The customer's users can then access the services subscribed to by the customer under this tenancy.

As indicated above, a CSP builds or deploys data centers to provide cloud services to its customers. As a CSP's customer base grows, the CSP typically builds new data centers in new regions or increases the capacity of existing data centers to service the customers' growing demands and to better serve the customers. Preferably, a data center is built in close geographical proximity to the location of customers serviced by that data center. Geographical proximity between a data center and customers serviced by that data center lends to more efficient use of resources and faster and more reliable services being provided to the customers. Accordingly, a CSP typically builds new data centers in new regions in geographical areas that are geographically proximal to the customers serviced by the data centers. For example, for a growing customer base in Germany, a CSP may build one or more data centers in a new region in Germany.

Building a data center (or multiple data centers) in a region is sometimes also referred to as building a region. The term "region build" is used to refer to building one or more data centers in a region. Building a data center in a region involves provisioning or creating a set of new resources that are needed or used for providing a set of services that the data center is configured to provide. The end result of the region build process is the creation of a data center in a region, where the data center is capable of providing a set of services intended for that data enter and includes a set of resources that are used to provide the set of services.

Building a new data center in a region is a very complex activity requiring coordination between various teams. At a high level, this involves the performance and coordination of various tasks such as: identifying the set of services to be provided by the data center, identifying various resources that are needed for providing the set of services, creating, provisioning, and deploying the identified resources, wiring the resources properly so that they can be used in an intended manner, and the like. Each of these tasks further have subtasks that need to be coordinated, further adding to the complexity. Due to this complexity, presently, the building of a data center in a region involves several manually-initiated or manually-controlled tasks that require careful manual coordination. As a result, the task of building a new region (i.e., building one or more data centers in a region) is very time consuming. It can take time, for example, many months to build a data center. Additionally, the process is very error prone, sometimes requiring several iterations before a desired configuration of the data center is achieved, which further adds to the time taken to build a data center. These limitations and problems severely limit a CSP's ability to grow in a timely manner responsive to increasing customer needs.

The present disclosure describes techniques for reducing the time and manual efforts needed for building one or more data centers in a region. This is made possible by automating several of the tasks that are involved in building a region. The automation significantly reduces the time needed to build a data center in a region and reduces the manual coordination that is needed. Instead of weeks and months needed to build a data center in a region in the past, the techniques described herein can be used to build a new data center in a region in a relatively much shorter time.

A Cloud Infrastructure Orchestration Service (CIOS) is disclosed herein that is configured to bootstrap (e.g., provision and deploy) services into a new data center based on predefined configuration files that identify the resources (e.g., infrastructure components and software to be deployed) for implementing a given change to the data center. The CIOS can identify dependencies between bootstrapping tasks using a static analysis of these configuration files. CIOS can use these dependencies to coordinate the order in which various changes are made to the new data center (e.g., the order by which services are bootstrapped in the region). The CIOS can detect various capabilities of the region as they become available which enables the system to identify and implement additional changes that can now be made to the region. Utilizing the techniques disclosed herein, the CIOS may optimize parallel processing to execute changes to the new data center while ensuring that tasks are not initiated until the functionality on which those tasks depend is available in the region. In this manner, the CIOS enables a region build to be performed as a substantially automated process, which greatly reduces the risk of error and time required in conventional systems.

During a region build, or at any suitable time, there may be any suitable number of resources (e.g., load balancers, databases, etc.) that may have been created during a previous region build (e.g., building of one or more data centers of a same or different region), or at least prior to the current region build. CIOS ensures that previously created resources (e.g., resources from another region) may be leveraged and used for bootstrapping purposes of the current region under build. A resource identification service (also referred to as a "Resource Hunter") may be configured to attempt discovery of resources at any suitable time. In some embodiments, the functionality provided by the Resource Hunter may be triggered by a Multi-Flock Orchestrator such that previously-created resources (e.g., resources of a previously built region or data center) may be imported and utilized in the region under build. Although resources may be created out-of-band with the region build, these previously created resources can be automatically imported and utilized by the region build to avoid duplicate resources being created. Through leveraging these previously created resources, the techniques herein ensure that processing resources are not wasted creating resources that are not needed. This in turn enables a region build to be performed faster than otherwise would be possible if every resource were to be created anew.

Certain Definitions

A "region" is a logical abstraction corresponding to a geographical location. A region can include any suitable number of one or more execution targets. In some embodiments, an execution target could correspond to a data center.

An "execution target" refers to a smallest unit of change for executing a release. A "release" refers to a representation of an intent to orchestrate a specific change to a service (e.g., deploy version 8, "add an internal DNS record," etc.). For most services, an execution target represents is an "instance" of a service. A single service can be bootstrapped to each of one or more execution targets. An execution target may be associated with a set of devices (e.g., a data center).

"Bootstrapping" is intended to refer to the collective tasks associated with provisioning and deployment of any suitable number of resources (e.g., infrastructure components, artifacts, etc.) corresponding to a single service.

A "service" refers to functionality provided by a set of resources. A set of resources for a service includes any suitable combination of infrastructure, platform, or software (e.g., an application) hosted by a cloud provider that can be configured to provide the functionality of a service. A service can be made available to users through the Internet.

An "artifact" refers to code being deployed to an infrastructure component or a Kubernetes engine cluster, this may include software (e.g., an application), configuration information (e.g., a configuration file) for an infrastructure component, or the like.

A "flock config" refers to a configuration file (or a set of configuration files) that describes a set of all resources (e.g., infrastructure components and artifacts) associated with a single service. A flock config may include declarative statements that specify one or more aspects corresponding to a desired state of the resources of the service.

"Service state" refers to a point-in-time snapshot of every resource (e.g., infrastructure resources, artifacts, etc.) associated with the service. The service state indicates status corresponding to provisioning and/or deployment tasks associated with service resources.

IaaS provisioning (or "provisioning") refers to acquiring computers or virtual hosts for use, and even installing needed libraries or services on them. The phrase "provisioning a device" refers to evolving a device to a state in which it can be utilized by an end-user for their specific use. A device that has undergone the provisioning process may be referred to as a "provisioned device." Preparing the provisioned device (installing libraries and daemons) may be part of provisioning; this preparation is different from deploying new applications or new versions of an application onto the prepared device. In most cases, deployment does not include provisioning, and the provisioning may need to be performed first. Once prepared, the device may be referred to as "an infrastructure component."

IaaS deployment (or "deployment") refers to the process of providing and/or installing a new application, or a new version of an application, onto a provisioned infrastructure component. Once the infrastructure component has been provisioned (e.g., acquired, assigned, prepared, etc.), additional software may be deployed (e.g., provided to and installed on the infrastructure component). The infrastructure component can be referred to as a "resource" after provisioning and deployment has concluded. Examples of resources may include, but are not limited to, virtual machines, databases, object storage, block storage, load balancers, and the like.

A "capability" identifies a unit of functionality associated with a service. The unit could be a portion, or all, of the functionality to be provided by the service. By way of example, a capability can be published indicating that a resource is available for authorization/authentication processing (e.g., a subset of the functionality to be provided by the resource). As another example, a capability can be published indicating the full functionality of the service is available. Capabilities can be used to identify functionality on which a resource or service depends and/or functionality of a resource or service that is available for use.

A "virtual bootstrap environment" (ViBE) refers to a virtual cloud network that is provisioned in the overlay of an existing region (e.g., a "host region"). Once provisioned, a ViBE is connected to a new region using a communication channel (e.g., an IPSec Tunnel VPN). Certain essential core services (or "seed" services) like a deployment orchestrator, a public key infrastructure (PKI) service, and the like can be provisioned in a ViBE. These services can provide the capabilities required to bring the hardware online, establish a chain of trust to the new region, and deploy the remaining services in the new region. Utilizing the virtual bootstrap environment can prevent circular dependencies between bootstrapping resources by utilizing resources of the host region. Services can be staged and texted in the ViBE prior to the physical region (e.g., the target region) being available.

A "Cloud Infrastructure Orchestration Service" (CIOS) may refer to a system configured to manage provisioning and deployment operations for any suitable number of services as part of a region build.

A Multi-Flock Orchestrator (MFO) may be a computing component (e.g., a service) configured that coordinates events between components of the CIOS to automatically provision and deploy services to a target region (e.g., a new region). An MFO tracks relevant events for each service of the region build and takes actions in response to those events.

A "host region" refers to a region that hosts a virtual bootstrap environment (ViBE). A host region may be used to bootstrap a ViBE.

A "target region" refers to a region under build.

"Publishing a capability" refers to "publishing" as used in a "publisher-subscriber" computing design or otherwise providing an indication that a particular capability is available (or unavailable). The capabilities are "published" (e.g., collected by a capabilities service, provided to a capabilities service, pushed, pulled, etc.) to provide an indication that functionality of a resource/service is available. In some embodiments, capabilities may be published/transmitted via an event, a notification, a data transmission, a function call, an API call, or the like. An event (or other notification/data transmission/etc.) indicating availability of a particular capability can be broadcasted/addressed (e.g., published) to a capabilities service.

A "Capabilities Service" may be a flock configured to model dependencies between different flocks. A capabilities service may be provided within a Cloud Infrastructure Orchestration Service and may define what capabilities, services, features have been made available in a region.

A "Real-time Regional Data DistributorDistributor" (RRDD) can be a service or system configured to manage region data. This region data can be injected into flock configs to dynamically create execution targets for new regions.

In some examples, techniques for implementing a Cloud Infrastructure Orchestration Service (CIOS) are described herein. Such techniques, as described briefly above, can be configured to manage bootstrapping (e.g., provisioning and deploying software to) infrastructure components within a cloud environment (e.g., a region). In some instances, the CIOS can include computing components (e.g., a CIOS Central and a CIOS Regional, both of which will be described in further detail below) that may be configured to manage bootstrapping tasks (provisioning and deployment) for a given service and a Multi-Flock Orchestrator (also described in further detail below) configured to initiate/manage region builds (e.g., bootstrapping operations corresponding to multiple services).

CIOS enables region building and world-wide infrastructure provisioning and code deployment with minimal manual run-time effort from service teams (e.g., beyond an initial approval and/or physical transportation of hardware, in some instances). The high-level responsibilities of CIOS include, but are not limited to, coordinating region builds in an automated fashion with minimal human intervention, providing users with a view of the current state of resources managed by the CIOS (e.g., of a region, across regions, world-wide, etc.), and managing bootstrapping operations for bootstrapping resources within a region.

The CIOS may provide view reconciliation, where a view of a desired state (e.g., a desired configuration) of resources may be reconciled with a current/actual state (e.g., a current configuration) of the resources. In some instances, view reconciliation may include obtaining state data to identify what resources are actually running and their current configuration and/or state. Reconciliation can be performed at a variety of granularities, such as at a service level.

CIOS can perform plan generation, where differences between the desired and current state of the resources are identified. Part of plan generation can include identifying the operations that would need to be executed to bring the resources from the current state to the desired state. Once the user is satisfied with a plan, the plan can then be marked as approved or rejected. Thus, users can spend less time reasoning about the plan and the plans are more accurate because they are machine generated. Plans are almost too detailed for human consumption; however, CIOS can provide this data via a sophisticated user interface (UI).

In some examples, CIOS can handle execution of change management by automatically executing the approved plan. Once an execution plan has been created and approved, engineers may no longer need to participate in change management unless CIOS initiates roll-back. CIOS can handle rolling back to a previous service version by automatically generating a plan that returns the service to a previous (e.g., pre-release) state (e.g., when CIOS detects service health degradation while executing).

CIOS can measure service health by monitoring alarms and executing integration tests. CIOS can help teams quickly define roll-back behavior in the event of service degradation, which it can later execute automatically. CIOS can automatically generate and display plans and can track approval. CIOS can combine the functionality of provisioning and deployment in a single system that coordinates these tasks across a region build. CIOS also supports automated discovery of flocks (e.g., service resources such as flock config(s) corresponding to any suitable number of services), artifacts, resources, and dependencies. CIOS can discover dependencies between execution tasks at every level (e.g., resource level, execution target level, phase level, service level, etc.) through a static analysis (e.g., including parsing and processing content) of one or more configuration files. Using these dependencies, CIOS can generate various data structures from these dependencies that can be used to drive task execution (e.g., tasks regarding provisioning of infrastructure resources and deployment of artifacts across the region).

FIG. 1 is a block diagram of an environment 100 in which a Cloud Infrastructure Orchestration Service (CIOS) 102 may operate to dynamically provide bootstrap services in a region, according to at least one embodiment. CIOS 102 can include, but is not limited to, the following components: Real-time Regional Data Distributor (RRDD) 104, Multi-Flock Orchestrator (HO) 106, CIOS Central 108, CIOS Regional 110, and Capabilities Service 112. Specific functionality of CIOS Central 108 and CIOS Regional 110 is provided in more detail in U.S. application Ser. No. 17/016,754, entitled "Techniques for Deploying Infrastructure Resources with a Declarative Provisioning Tool," the entire contents of which are incorporated in its entirety for all purposes. In some embodiments, any suitable combination of the components of CIOS 102 may be provided as a service. In some embodiments, some portion of CIOS 102 may be deployed to a region (e.g., a data center represented by host region 103). In some embodiments, CIOS 102 may include any suitable number of cloud services (not depicted in FIG. 1) discussed in further detail in U.S. application Ser. No. 17/016,754 and below with respect to FIGS. 2 and 3.

Real-time Regional Data Distributor (RRDD) 104 may be configured to maintain and provide region data that identifies realms, regions, execution targets, and availability domains. In some cases, the region data may be in any suitable form (e.g., JSON format, data objects/containers, XML, etc.). Region data maintained by RRDD 104 may include any suitable number of subsets of data which can individually be referenceable by a corresponding identifier. By way of example, an identifier "all_regions" can be associated with a data structure (e.g., a list, a structure, an object, etc.) that includes a metadata for all defined regions. As another example, an identifier such as "realms" can be associated with a data structure that identifies metadata for a number of realms and a set of regions corresponding to each realm. In general, the region data may maintain any suitable attribute of one or more realm(s), region(s), availability domains (ADs), execution target(s) (ETs), and the like, such as identifiers, DNS suffixes, states (e.g., a state of a region), and the like. The RRDD 104 may be configured to manage region state as part of the region data. A region state may include any suitable information indicating a state of bootstrapping within a region. By way of example, some example region states can include "initial," "building," "production," "paused," or "deprecated." The "initial" state may indicate a region that has not yet been bootstrapped. A "building" state may indicate that bootstrapping of one or more flocks within the region has commenced. A "production" state may indicate that bootstrapping has been completed and the region is ready for validation. A "paused" state may indicate that CIOS Central 108 or CIOS Regional 110 has paused internal interactions with the regional stack, likely due to an operational issue. A "deprecated" state may indicate the region has been deprecated and is likely unavailable and/or will not be contacted again.

CIOS Central 108 is configured to provide any suitable number of user interfaces with which users (e.g., user 109) may interact with CIOS 102. By way of example, users can make changes to region data via a user interface provided by CIOS Central 108. CIOS Central 108 may additionally provide a variety of interfaces that enable users to: view changes made to flock configs and/or artifacts, generate and view plans, approve/reject plans, view status on plan execution (e.g., corresponding to tasks involving infrastructure provisioning, deployment, region build, and/or desired state of any suitable number of resources managed by CIOS 102. CIOS Central 108 may implement a control plane configured to manage any suitable number of CIOS Regional 110 instances. CIOS Central 108 can provide one or more user interfaces for presenting region data, enabling the user 109 to view and/or change region data. CIOS Central 108 can be configured to invoke the functionality of RRDD 104 via any suitable number of interfaces. Generally, CIOS Central 108 may be configured to manager region data, either directly or indirectly (e.g., via RRDD 104). CIOS Central 108 may be configured to compile flock configs to inject region data as variables within the flock configs.

Each instance of CIOS Regional 110 may correspond to a module configured to execute bootstrapping tasks that are associated with a single service of a region. CIOS Regional 110 can receive desired state data from CIOS Central 108. In some embodiments, desired state data may include a flock config that declares (e.g., via declarative statements) a desired state of resources associated with a service. CIOS Central 108 can maintain current state data indicating any suitable aspect of the current state of the resources associated with a service. In some embodiments, CIOS Regional 110 can identify, through a comparison of the desired state data and the current state data, that changes are needed to one or more resources. For example, CIOS Regional 110 can determine that one or more infrastructure components need to be provisioned, one or more artifacts deployed, or any suitable change needed to the resources of the service to bring the state of those resources in line with the desired state. As CIOS Regional 110 performs bootstrapping operations, it may publish data indicating various capabilities of a resource as they become available. A "capability" identifies a unit of functionality associated with a service. The unit could be a portion, or all of the functionality to be provided by the service. By way of example, a capability can be published indicating that a resource is available for authorization/authentication processing (e.g., a subset of the functionality to be provided by the resource). As another example, a capability can be published indicating the full functionality of the service is available. Capabilities can be used to identify functionality on which a resource or service depends and/or functionality of a resource or service that is available for use.

Capabilities Service 112 is configured to maintain capabilities data that indicates 1) what capabilities of various services are currently available, 2) whether any resource/service is waiting on a particular capability, 3) what particular resources and/or services are waiting on a given capability, or any suitable combination of the above. Capabilities Service 112 may provide an interface with which capabilities data may be requested. Capabilities Service 112 may provide one or more interfaces (e.g., application programming interfaces) that enable it to transmit capabilities data to MFO 106 and/or CIOS Regional 110 (e.g., each instance of CIOS Regional 110). In some embodiments, MFO 106 and/or any suitable component or module of CIOS Regional 110 may be configured to request capabilities data from Capabilities Service 112.

In some embodiments, Multi-Flock Orchestrator (MFO) 106 may be configured to drive region build efforts. In some embodiments, MFO 106 can manage information that describes what flock/flock config versions and/or artifact versions are to be utilized to bootstrap a given service within a region (or to make a unit of change to a target region). In some embodiments, MFO 106 may be configured to monitor (or be otherwise notified of) changes to the region data managed by Real-time Regional Data Distributor 104. In some embodiments, receiving an indication that region data has been changed may cause a region build to be triggered by MFO 106. In some embodiments, MFO 106 may collect various flock configs and artifacts to be used for a region build. Some, or all, of the flock configs may be configured to be region agnostic. That is, the flock configs may not explicitly identify what regions to which the flock is to be bootstrapped. In some embodiments, MFO 106 may trigger a data injection process through which the collected flock configs are recompiled (e.g., by CIOS Central 108). During recompilation, operations may be executed (e.g., by CIOS Central 108) to cause the region data maintained by Real-time Regional Data Distributor 104 to be injected into the config files. Flock configs can reference region data through variables/parameters without requiring hard-coded identification of region data. The flock configs can be dynamically modified at run time using this data injection rather than having the region data be hardcoded, and therefore, and more difficult to change.

Multi-Flock Orchestrator 106 can perform a static flock analysis in which the flock configs are parsed to identify dependencies between resources, execution targets, phases, and flocks, and in particular to identify circular dependencies that need to be removed. In some embodiments, MFO 106 can generate any suitable number of data structures based on the dependencies identified. These data structures (e.g., directed acyclic graph(s), linked lists, etc.) may be utilized by the Cloud Infrastructure Orchestration Service 102 to drive operations for performing a region build. By way of example, these data structures may collectively define an order by which services are bootstrapped within a region. An example of such a data structure is discussed further below with respect to Build Dependency Graph 338 of FIG. 3. If circular dependencies (e.g., service A requires service B and vice versa) exist and are identified through the static flock analysis and/or graph, WO may be configured to notify any suitable service teams that changes are required to the corresponding flock config to correct these circular dependencies. MFO 106 can be configured to traverse one or more data structures to manage an order by which services are bootstrapped to a region. MFO 106 can identify (e.g., using data obtained from Capabilities Service 112) capabilities available within a given region at any given time. MFO 106 can this data to identify when it can bootstrap a service, when bootstrapping is blocked, and/or when bootstrapping operations associated with a previously blocked service can resume. Based on this traversal, MFO 106 can perform a variety of releases in which instructions are transmitted by MFO 106 to CIOS Central 108 to perform bootstrapping operations corresponding to any suitable number of flock configs. In some examples, MFO 106 may be configured to identify that one or more flock configs may require multiple releases due to circular dependencies found within the graph. As a result, MFO 106 may transmit multiple instruction sets to CIOS Central 108 for a given flock config to break the circular dependencies identified in the graph.

In some embodiments, a user can request that a new region (e.g., target region 114) be built. This can involve bootstrapping resources corresponding to a variety of services. In some embodiments, target region 114 may not be communicatively available (and/or secure) at a time at which the region build request is initiated. Rather than delay bootstrapping until such time as target region 114 is available and configured to perform bootstrapping operations, CIOS 102 may initiate the region build using a virtual bootstrap environment 116. Virtual bootstrap environment (ViBE) 116 may be an overlay network that is hosted by host region 103 (a preexisting region that has previously been configured with a core set of services and which is communicatively available and secure). MFO 106 can leverage resources of the host region 103 to bootstrap resources to the ViBE 116 (generally referred to as "building the ViBE"). By way of example, MFO 106 can provide instructions through CIOS Central 108 that cause an instance of CIOS Regional 110 within a host region (e.g., host region 103) to bootstrap another instance of CIOS Regional within the ViBE 116. Once the CIOS Regional within the ViBE is available for processing, bootstrapping the services for the target region 114 can continue within the ViBE 116. When target region 114 is available to perform bootstrapping operations, the previously bootstrapped services within ViBE 116 may be migrated to target region 114. Utilizing these techniques, CIOS 102 can greatly improve the speed at which a region is built by drastically reducing the need for any manual input and/or configuration to be provided.

Figure 2:
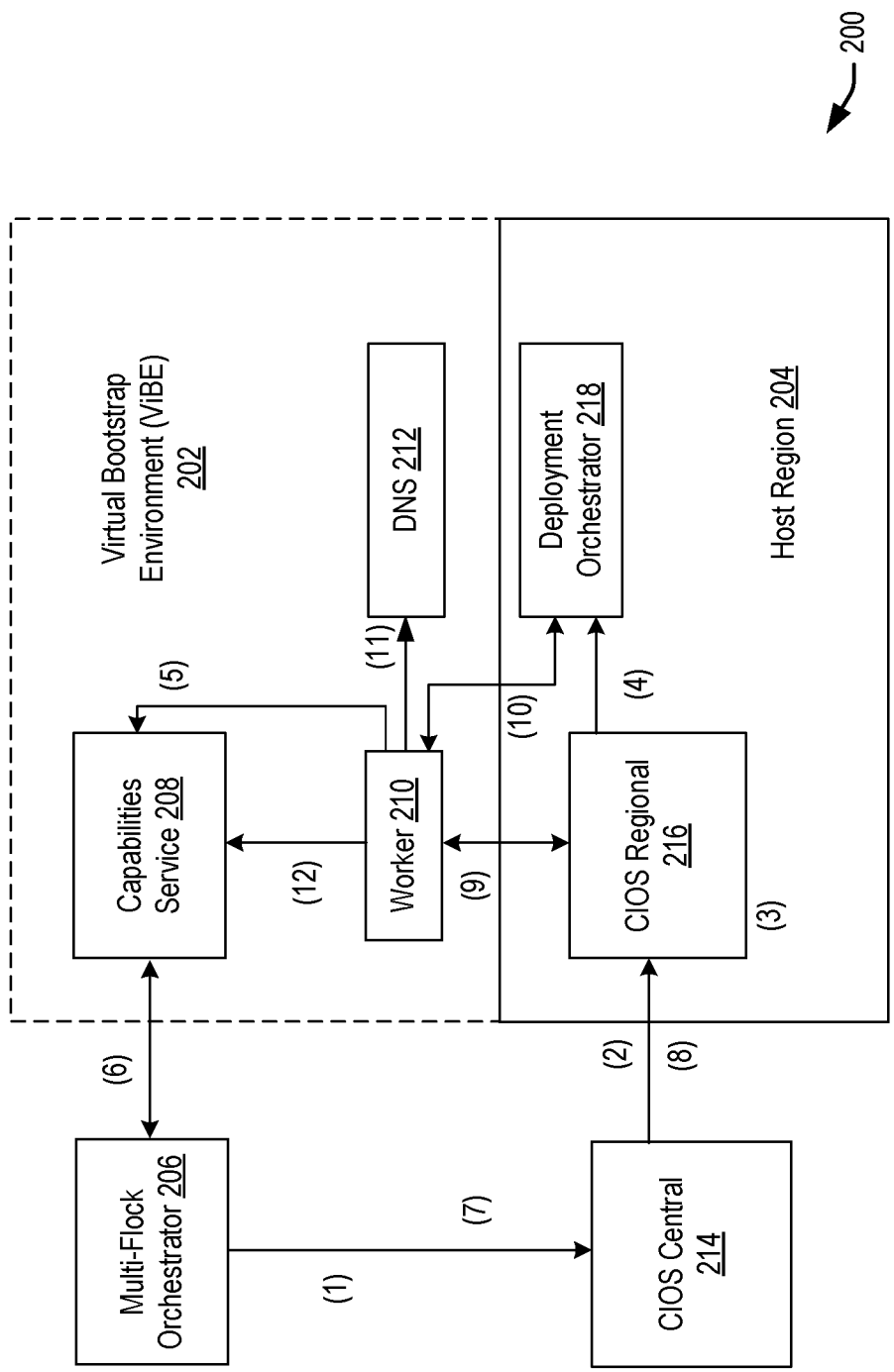
FIG. 2 is a block diagram for illustrating an environment and method for building a virtual bootstrap environment (ViBE), according to at least one embodiment.

FIG. 2 is a block diagram for illustrating an environment 200 and method for building a virtual bootstrap environment (ViBE) 202 (an example of ViBE 116 of FIG. 1), according to at least one embodiment. ViBE 202 represents a virtual cloud network that is provisioned in the overlay of an existing region (e.g., host region 204, an example of the host region 103 of FIG. 1 and in an embodiment is a Host Region Service Enclave). ViBE 202 represents an environment in which services can be staged for a target region (e.g., a region under build such as target region 114 of FIG. 1) before the target region becomes available.

In order to bootstrap a new region (e.g., target region 114 of FIG. 1), a cores set of services may be bootstrapped. While those core set of services exist in the host region 204, they do not yet exist in the ViBE (nor the target region). These essential core services provide the functionality needed to provision devices, establish a chain of trust to the new region, and deploy remaining services (e.g., flocks) into a region. The ViBE 202 may be a tenancy that is deployed in a host region 204. It can be thought of as a virtual region.

When the target region is available to provide bootstrapping operations, the ViBE 202 can be connected to the target region so that services in the ViBE can interact with the services and/or infrastructure components of the target region. This will enable deployment of production level services, instead of self-contained seed services as in previous systems, and will require connectivity over the internet to the target region. Conventionally, a seed service was deployed as part of a container collection and used to bootstrap dependencies necessary to build out the region. Using infrastructure/tooling of an existing region, resources may be bootstrapped (e.g., provisioned and deployed) into the ViBE 202 and connected to the service enclave of a region (e.g., host region 204) in order to provision hardware and deploy services until the target region is self-sufficient and can be communicated with directly. Utilizing the ViBE 202 allows for standing up the dependencies and services needed to be able to provision/prepare infrastructure and deploy software while making use of the host region's resources in order to break circular dependencies of core services.

Multi-Flock Orchestrator (MFO) 206 may be configured to perform operations to build (e.g., configure) ViBE 202. MFO 206 can obtain applicable flock configs corresponding to various resources to be bootstrapped to the new region (in this case, a ViBE region, ViBE 202). By way of example, MFO 206 may obtain a flock config (e.g., a "ViBE flock config") that identifies aspects of bootstrapping Capabilities Service 208 and Worker 210. As another example, MFO 206 may obtain another flock config corresponding to bootstrapping Domain Name Service (DNS) 212 to ViBE 202.

At step 1, MFO 206 may instruct CIOS Central 214 (e.g., an example of CIOS Central 108 and CIOS Central 214 of FIGS. 1 and 2, respectively). For example, MFO 206 may transmit a request (e.g., including the ViBE flock config) to request bootstrapping of the Capabilities Service 208 and Worker 210 that, at this time do not yet exist in the ViBE 202. In some embodiments, CIOS Central 214 may have access to all flock configs. Therefore, in some examples, MFO 206 may transmit an identifier for the ViBE flock config rather than the file itself, and CIOS Central 214 may independently obtain it from storage (e.g., from DB 308 or flock DB 312 of FIG. 3).

At step 2, CIOS Central 214 may provide the ViBE flock config via a corresponding request to CIOS Regional 216. CIOS Regional 216 may parse the ViBE flock config to identify and execute specific infrastructure provisioning and deployment operations at step 3.

In some embodiments, the CIOS Regional 216 may utilize additional corresponding services for provisioning and deployment. For example, at step 4, CIOS Regional 216 CIOS Regionalmay instruct deployment orchestrator 218 (e.g., an example of a core service, or other write, build, and deploy applications software, of the host region 204) to execute instructions that in turn cause Capabilities Service 208 and Worker 210 to be bootratpped within ViBE 202.

At step 5, a capability may be transmitted to the Capabilities Service 208 (from the CIOS Regional 216, Deployment Orchestrator 218 via the Worker 210 or otherwise) indicating that resources corresponding to the ViBE flock are available. Capabilities Service 208 may persist this data. In some embodiments, the Capabilities Service 208 adds this information to a list it maintains of available capabilities with the ViBE. By way of example, the capability provided to Capabilities Service 208 at step 5 may indicate the Capabilities Service 208 and Worker 210 are available for processing.

At step 6, MFO 206 may identify that the capability indicating that Capabilities Service 208 and Worker 210 are available based on receiving or obtaining data (an identifier corresponding to the capability) from the Capabilities Service 208.

At step 7, as a result of receiving/obtaining the data at step 6, the MFO 206 may instruct CIOS Central 214 to bootstrap a DNS service (e.g., DNS 212) to the ViBE 202. The instructions may identify or include a particular flock config corresponding to the DNS service.

At step 8, the CIOS Central 214 may instruct the CIOS Regional 216 to deploy DNS 212 to the ViBE 202. In some embodiments, the DNS flock config for the DNS 212 is provided by the CIOS Central 214.

At step 9, Worker 210, now that it is deployed in the ViBE 202, may be assigned by CIOS Regional 216 to the task of deploying DNS 212. Worker may execute a declarative infrastructure provisioner in the manner described above in connection with FIG. 3 to identify (e.g., from comparing the flock config (the desired state) to a current state of the (currently non-existing) resources associated with the flock) a set of operations that need to be executed to deploy DNS 212.

At step 10, the Deployment Orchestrator 218 may instruct Worker 210 to deploy DNS 212 in accordance with the operations identified at step 9. As depicted, Worker 210 proceeds with executing operations to deploy DNS 212 to ViBE 202 at step 11. At step 12, Worker 210 notifies Capabilities Service 208 that DNS 212 is available in ViBE 202. MFO 206 may subsequently identify that the resources associated with the ViBE flock config and the DNS flock config are available any may proceed to bootstrap any suitable number of additional resources to the ViBE.

After steps 1-12 are concluded, the process for building the ViBE 202 can be considered complete and the ViBE 202 can be considered built.

Figure 3:
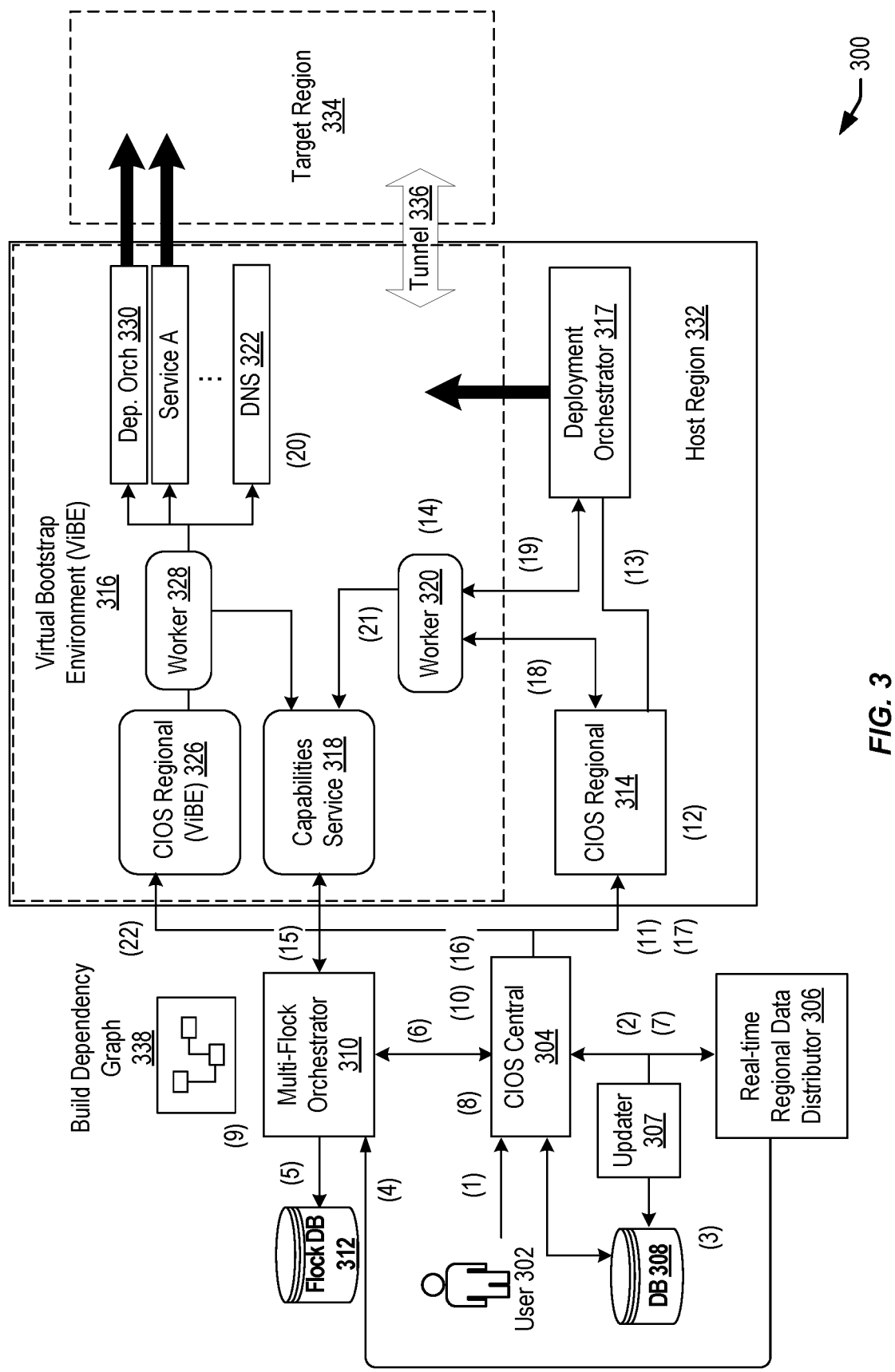
FIG. 3 is a block diagram for illustrating an environment and method for bootstrapping services to a target region (e.g., a target data center) utilizing the ViBE, according to at least one embodiment.

FIG. 3 is a block diagram for illustrating an environment 300 and method for bootstrapping services to a target region utilizing the ViBE, according to at least one embodiment.

At step 1, user 302 may utilize any suitable user interface provided by CIOS Central 304 (an example of CIOS Central 108 and CIOS Central 214 of FIGS. 1 and 2, respectively) to modify region data. By way of example, user 302 may create a new region to which a number of services are to be bootstrapped.

At step 2, CIOS Central 304 may execute operations to send the change to RRDD 306 (e.g., an example of RRDD 104 of FIG. 1). At step 3, RRDD 306 may store the received region data in database 308, a data store configured to store region data including any suitable identifier, attribute, state, etc. of a region, AD, realm, ET, or the like. In some embodiments, updater 307 may be utilized to store region data in database 308 or any suitable data store from which such updates may be accessible (e.g., to service teams). In some embodiments, updater 307 may be configured to notify (e.g., via any suitable electronic notification) of updates made to database 308.

At step 4, MFO 310 (an example of the MFO 106 and 206 of FIGS. 1 and 2, respectively) may detect the change in region data. In some embodiments, MFO 310 may be configured to poll RRDD 306 for changes in region data. In some embodiments, RRDD 306 may be configured to publish or otherwise notify MFO 310 of region changes.

At step 5, detecting the change in region data may trigger MFO 310 to obtain a version set (e.g., a version set associated with a particular identifier such as a "golden version set" identifier). identifying a particular version for each flock (e.g., service) that is to be bootstrapped to the new region and a particular version for each artifact corresponding to that flock. The version set may be obtained from DB 312. As flocks evolve and change, the versions for their corresponding configs and artifacts used for region build may change. These changes may be persisted in flock DB 312 such that MFO 310 may identify which versions of flock configs and artifacts to use for building a region (e.g., a ViBE region, a Target Region/non-ViBE Region, etc.). The flock configs (e.g., all versions of the flock configs) and/or artifacts (e.g., all versions of the artifacts) may be stored in DB 308, DB 312, or any suitable data store accessible to the CIOS Central 304 and/or MFO 310.

At step 6, MFO 310 may request CIOS Central 304 to recompile of each of the flock configs associated with the version set with the current region data. In some embodiments, the request may indicate a version for each flock config and/or artifact corresponding to those flock configs.

At step 7, CIOS Central 304 may obtain current region data from the DB 308 (e.g., directly, or via Real-time Regional Data Distributor 306) and retrieve any suitable flock config and artifact in accordance with the versions requested by MFO 310.

At step 8, CIOS Central 304 may recompile the flock configs with the region data obtained at step 7 to inject the flock configs with current region data. CIOS Central 304 may return the compiled flock configs to MFO 310. In some embodiments, CIOS Central 304 may simply indicate compilation is done, and MFO 310 may access the recompiled flock configs via RRDD 306.

At step 9, MFO 310 may perform a static analysis of the recompiled flock configs. As part of the static analysis, MFO 310 may parse the flock configs (e.g., using a library associated with a declarative infrastructure provisioner (e.g., Terraform, or the like)) to identify dependencies between flocks. From the analysis and the dependencies identified, MFO 310 can generate Build Dependency Graph 338. Build Dependency Graph 338 may be an acyclic directed graph that identifies an order by which flocks are to be bootstrapped (and/or changes indicated in flock configs are to be applied) to the new region. Each node in the graph may correspond to bootstrapping any suitable protion of a particular flock. The specific bootstrapping order may be identified based at least in part on the dependencies. In some embodiments, the dependencies may be expressed as an attribute of the node and/or indicated via edges of the graph that connect the nodes. MFO 310 may traverse the graph (e.g., beginning at a starting node) to drive the operations of the region build.

In some embodiments, MFO 310 may utilize a cycle detection algorithm to detect the presence of a cycle (e.g., service A depends on service B and vice versa). MFO 310 can identify orphaned capabilities dependencies. For example, MFO 310 can identify orphaned nodes of the Build Dependency Graph 338 that do not connect to any other nodes. MFO 310 may identify falsely published capabilities (e.g., when a capability was prematurely published and the corresponding functionality is not actually yet available). MFO 310 can detect from the graph that one or more instances of publishing the same capability exist. In some embodiments, any suitable number of these errors may be detected and MFO 310 (or another suitable component such as CIOS Central 304) may be configured to notify or otherwise present this information to users (e.g., via an electronic notification, a user interface, or the like). In some embodiments, MFO 310 may be configured to force delete/recreate resources to break circular dependencies and may once again provide instructions to CIOS Central 304 to perform bootstrapping operations for those resources and/or corresponding flock configs.

A starting node may correspond to bootstrapping the ViBE flock, a second node may correspond to bootstrapping DNS. The steps 10-15 correspond to deploying (via deployment orchestrator 317, an example of the deployment orchestrator 218 of FIG. 2) a ViBE flock to ViBE 316 (e.g., an example of ViBE 116 and 202 of FIGS. 1, and 2, respectively). That is, steps 10-15 of FIG. 3 generally correspond to steps 1-6 of FIG. 2. Once notified that capabilities exist corresponding to the ViBE flock being deployed (e.g., indicating that Capabilities Service 318 and Worker 320, corresponding to Capabilities Service 208 and Worker 210 of FIG. 2, are available) the MFO 310 recommence traversal of the Build Dependency Graph 338 to identify next operations to be executed.

By way of example, MFO 310 may continue traversing the Build Dependency Graph 338 to identify that a DNS flock is to be deployed. Steps 16-21 may be executed to deploy DNS 322 (an example of the DNS 212 of FIG. 2). These operations may generally correspond to steps 7-12 of FIG. 2.

At step 21, a capability may be stored indicating that DNS 322 is available. Upon detecting this capability, MFO 310 may recommence traversal of the Build Dependency Graph 338. On this traversal, the MFO 310 may identify that any suitable portion of an instance of CIOS Regional (e.g., an example of CIOS Regional 314) is to be deployed to the ViBE 316. In some embodiments, steps 16-21 may be substantially repeated with respect to deploying CIOS Regional (ViBE) 326 (an instance of CIOS Regional 314, CIOS Regional 110 of FIG. 1) and Worker 328 to the ViBE 316. A capability may be transmitted to the Capabilities Service 318 that CIOS Regional (ViBE) 326 is available.

Upon detecting the CIOS Regional (ViBE) 326 is available, MFO 310 may recommence traversal of the Build Dependency Graph 338. On this traversal, the MFO 310 may identify that a deployment orchestrator (e.g., Deployment Orchestrator 330, an example of the Deployment Orchestrator 317) is to be deployed to the ViBE 316. In some embodiments, steps 16-21 may be substantially repeated with respect to deploying Deployment Orchestrator 330. Information that identifies a capability may be transmitted to the Capabilities Service 318, indicating that Deployment Orchestrator 330 is available.

After Deployment Orchestrator 330 is deployed, ViBE 316 may be considered available for processing subsequent requests. Upon detecting Deployment Orchestrator 330 is available, MFO 310 may instruct subsequent bootstrapping requests to be routed to ViBE components rather than utilizing host region components (components of host region 332). Thus, MFO 310 can continue traversing the Build Dependency Graph 338, at each node instructing flock deployment to the ViBE 316 via CIOS Central 304. CIOS Central 304 may request CIOS Regional (ViBE) 326 to deploy resources according to the flock config.

At some point during this process, Target Region 334 may become available. Indication that the Target Region is available may be identifiable from region data for the Target Region 334 being provided by the user 302 (e.g., as an update to the region data). The availability of Target Region 334 may depend on establishing a network connection between the Target Region 334 and external networks (e.g., the Internet). The network connection may be supported over a public network (e.g., the Internet), but use software security tools (e.g., IPSec) to provide one or more encrypted tunnels (e.g., IPSec tunnels such as tunnel 336) from the ViBE 316 to Target Region 334. As used herein, "IPSec" refers to a protocol suite for authenticating and encrypting network traffic over a network that uses Internet Protocol (IP), and can include one or more available implementations of the protocol suite (e.g., Openswan, Libreswan, strongSwan, etc.). The network may connect the ViBE 316 to the service enclave of the Target Region 334.

Prior to establishing the IPSec tunnels, the initial network connection to the Target Region 334 may be on a connection (e.g., an out-of-band VPN tunnel) sufficient to allow bootstrapping of networking services until an IPSec gateway may be deployed on an asset (e.g., bare-metal asset) in the Target Region 334. To bootstrap the Target Region's 334 network resources, Deployment Orchestrator 330 can deploy the IPSec gateway at the asset within Target Region 334. The Deployment Orchestrator 330 may then deploy VPN hosts at the Target Region 334 configured to terminate IPSec tunnels from the ViBE 316. Once services (e.g., Deployment Orchestrator 330, Service A, etc.) in the ViBE 316 can establish an IPSec connection with the VPN hosts in the Target Region 334, bootstrapping operations from the ViBE 316 to the Target Region 334 may begin.

In some embodiments, the bootstrapping operations may begin with services in the ViBE 316 provisioning resources in the Target Region 334 to support hosting instances of core services as they are deployed from the ViBE 316. For example, a host provisioning service may provision hypervisors on infrastructure (e.g., bare-metal hosts) in the Target Region 334 to allocate computing resources for VMs. When the host provisioning service completes allocation of physical resources in the Target Region 334, the host provisioning service may publish information indicating a capability that indicates that the physical resources in the Target Region 334 have been allocated. The capability may be published to Capabilities Service 318 via CIOS Regional (ViBE) 326 (e.g., by Worker 328).

With the hardware allocation of the Target Region 334 established and posted to capabilities service 318, CIOS Regional (ViBE) 326 can orchestrate the deployment of instances of core services from the ViBE 316 to the Target Region 334. This deployment may be similar to the processes described above for building the ViBE 316, but using components of the ViBE (e.g., CIOS Regional (ViBE) 326, Worker 328, Deployment Orchestrator 330) instead of components of the Host Region 332 service enclave. The deployment operations may generally correspond to steps 16-21 described above.

As a service is deployed from the ViBE 316 to the Target Region 334, the DNS record associated with that service may correspond to the instance of the service in the ViBE 316. The DNS record associated with the service may be updated at a later time to complete deployment of the service to the Target Region 334. Said another way, the instance of the service in the ViBE 316 may continue to receive traffic (e.g., requests) to the service until the DNS record is updated. A service may deploy partially into the Target Region 334 and publish information indicating a capability (e.g., to Capabilities Service 318) that the service is partially deployed. For example, a service running in the ViBE 316 may be deployed into the Target Region 334 with a corresponding compute instance, load balancer, and associated applications and other software, but may need to wait for database data to migrate to the Target Region 334 before being completely deployed. The DNS record (e.g., managed by DNS 322) may still be associated with the service in the ViBE 316. Once data migration for the service is complete, the DNS record may be updated to point to the operational service deployed in the Target Region 334. The deployed service in the Target Region 334 may then receive traffic (e.g., requests) for the service, while the instance of the service in the ViBE 316 may no longer receive traffic for the service.

Resource Discovery

Figure 4:
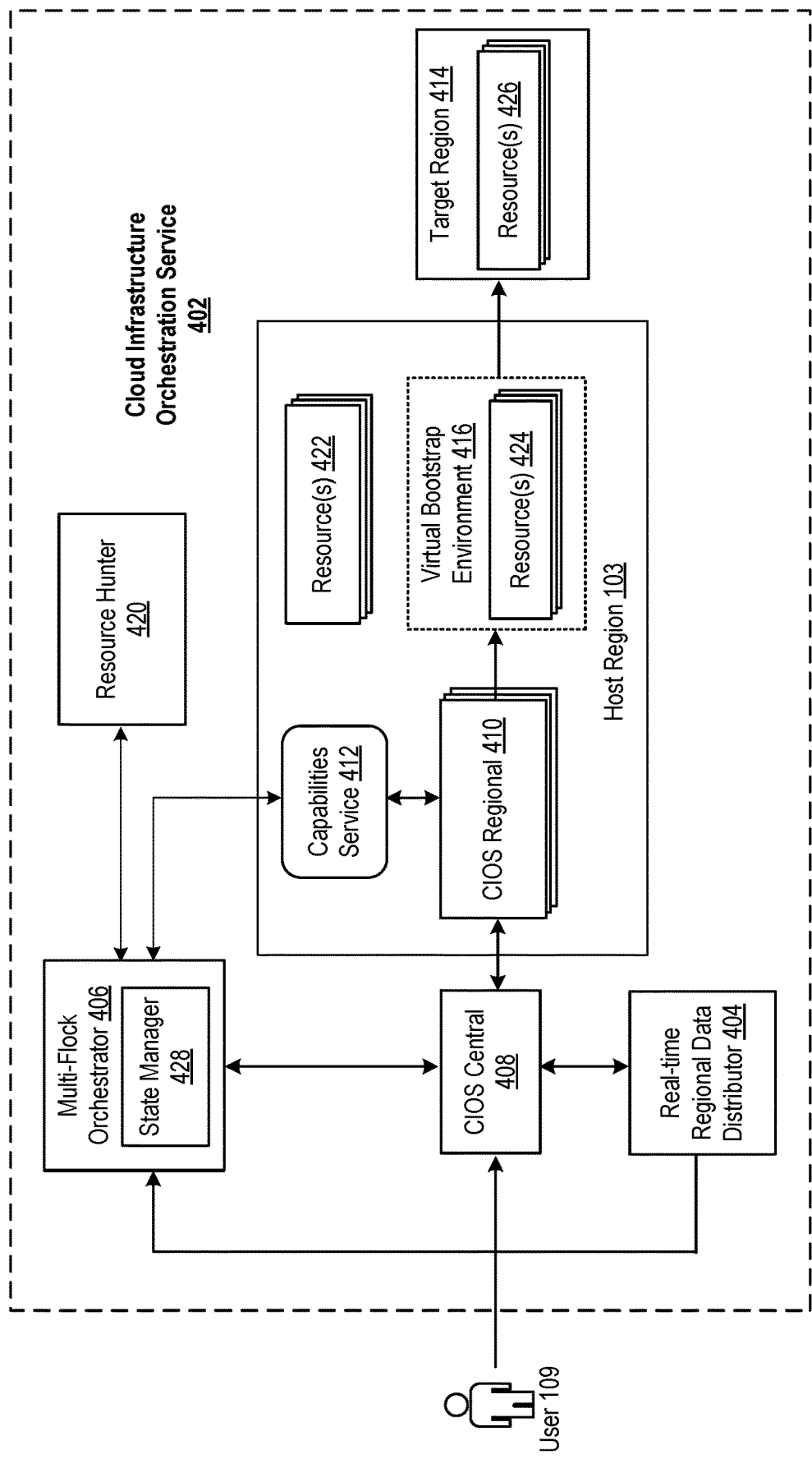
FIG. 4 is a block diagram of an environment in which the Cloud Infrastructure Orchestration Service (CIOS) may utilize a Resource Discovery to discover resources during a region build, according to at least one embodiment.

FIG. 4 is a block diagram of an environment 400 in which the Cloud Infrastructure Orchestration Service (CIOS) may utilize a Resource Hunter (e.g., Resource Hunter 420) to discover resources (e.g., on demand, during a region build, etc.), according to at least one embodiment. Environment 400 may be an example of environment 100 of FIG. 1. The Cloud Infrastructure Orchestration Service (CIOS) 402 may be an example of the CIOS 102 of FIG. 1. Real-time Regional Data Distributor (RRDD) 404 may be an example of the Real-time Regional Data Distributor 104 and/or 306 of FIGS. 1 and 3, respectively. Multi-Flock Orchestrator (WO) 406 may be an example of the Multi-Flock Orchestrator 104, 206, and/or 310 of FIG. 1-3, respectively. CIOS Central 408 (also referred to as a "provisioning and deployment service") may be an example of the CIOS Central 108, 214, and/or 304 of FIGS. 1-3, respectively. CIOS Regional 410 may be an example of the CIOS Regional 110, 216, and/or 314 of FIGS. 1-3, respectively. Capabilities Service 412 may be an example of the Capabilities Service 112, 208, and/or 318 of FIGS. 1-3, respectively. Target Region 414 may be an example of the Target Region 114 and/or 334 of FIGS. 1 and 3, respectively. Virtual Bootstrap Environment 416 may be an example of the Virtual Bootstrap Environment 114, 202, and/or 316 of FIGS. 1-3, respectively. The components of CIOS 402, including RRDD 404, MFO 406, CIOS Central 508, CIOS Regional 410, and Capabilities Service 412, may each perform the respective functionality discussed above in FIGS. 1-3 in connection with the corresponding components of FIGS. 1-3.

Environment 500 may include Resource Hunter (RH) 420 (also referred to as a "Resource Identification Service"). RH 420 may be configured to attempt discovery of resources at any suitable time. By way of example, any suitable number of resources may exist in any suitable region prior to a region build of that, or another region. By way of example, resource(s) 422 may include any suitable number of resources (e.g., infrastructure resources, artifacts, configuration files, etc.) that exist in the host region 403 (an example of the host region 103, 204, and/or 332 of FIG. 1-3, respectively). Resource(s) 424 may exist in the ViBE 416 and/or resource(s) 426 may exist in target region. Any suitable combination of resource(s) 422-426 may be created at any suitable time prior to, during, or after a region build process is executed to bootstrap any suitable number of services within ViBE 416 and/or Target Region 414.

RH 420 may be configured to receive flock config information from MFO 406 (and/or any suitable component of the CIOS 402 and/or any service bootstrapped within the Host Region 403, the ViBE 416, and/or the Target Region 414). In some embodiments, MFO 406 may provide an identifier of the flock and RH 420 may be configured to access corresponding flock config files associated with that flock. Alternatively, MFO 406 may provide the flock config to RH 420. An example flock config is discussed in more detail in connection with FIG. 5 below.

RH 420 may identify resource discovery data within the flock config. "Resource discovery data" refers to any suitable data (e.g., a set of parameters) with which a previously existing resource (e.g., one or more of resource(s) 422-426) may be identified. RH 420 may execute operations to identify any suitable number of the resource(s) 422-426 utilizing the set of parameters of the resource discovery data. For example, RH 420 may search (e.g., within a region specified by the resource discovery data and/or globally) for particular resources that are associated with attributes that match the set of parameters provided in the resource discovery data. If one or more matching resources are discovered, RH 420 may provide the identifier(s) for the matching resource(s) to MFO 406 directly, and/or RH 420 may store the identifier(s) within a record accessible to MFO 406.

MFO 406 may include a State Manager 428. The State Manager 428 may be configured to implement a state machine that transitions between states to drive a pass. By way of example, a single flock may require multiple releases (e.g., multiple transmissions of instructions to CIOS Central 408, multiple releases corresponding to one or more flock configs associated with a single service, etc.). State Manager 428 may be configured to coordinate the operations performed for a single release. This may include monitoring for messages from CIOS Central 408 and/or Resource Hunter 420. In some embodiments, the State Manager 428 may be configured to monitor for one or more capabilities transmitted by Capabilities Service 412. The operations performed by the State Manager 428 may be discussed in further detail with respect to FIGS. 6 and 7.

Figure 5:
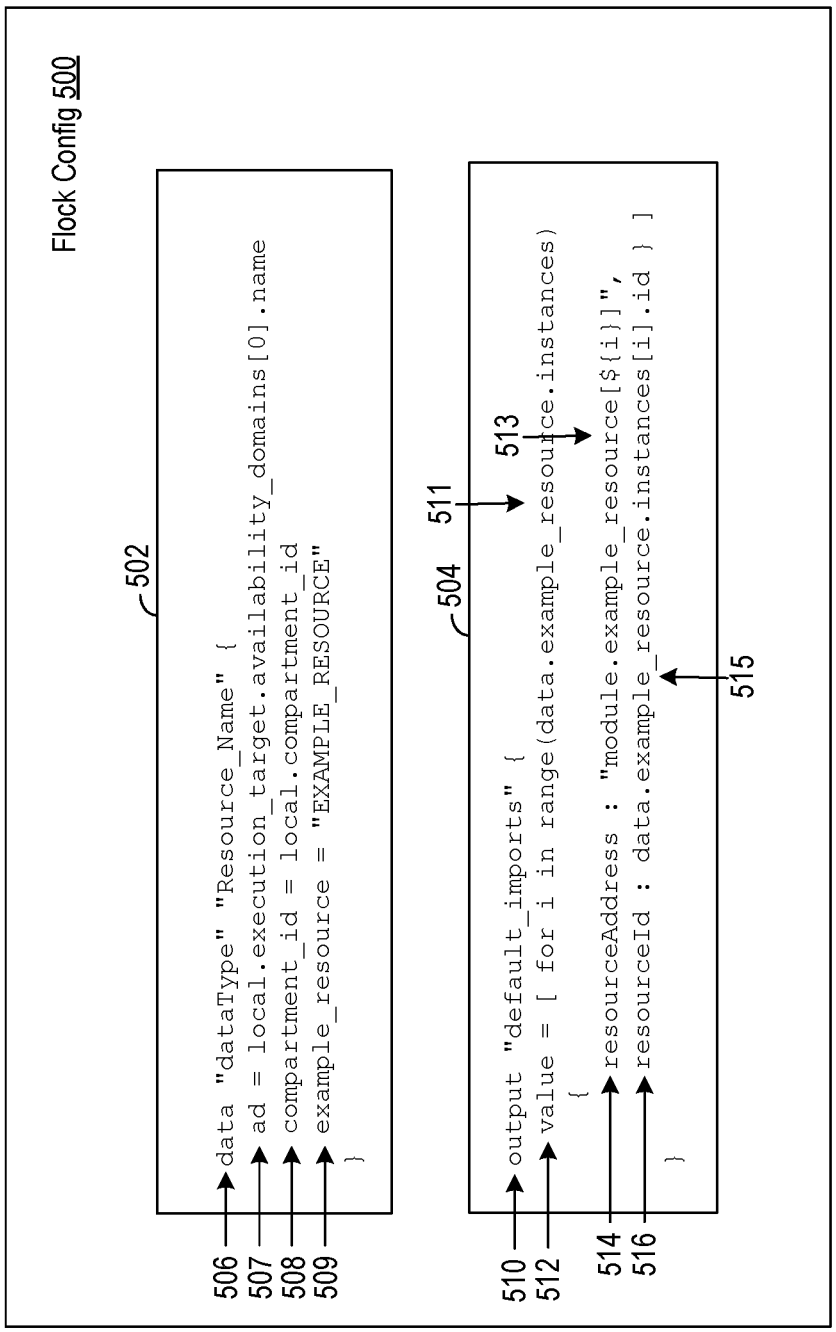
FIG. 5 depicts an example flock configuration file including one or more code segments related to resource discovery, according to at least one embodiment.

FIG. 5 depicts an example flock configuration file 500 including one or more code segments (e.g., code segment 502 and code segment 504) related to resource discovery, according to at least one embodiment. It should be appreciated that flock configuration file 500 (or other flock configuration files corresponding to the same service) may further include additional code segments that describe the resources (e.g., infrastructure components, artifacts, data, etc.) of the service, a number of phases corresponding to bootstrapping the service across respective sets of execution targets corresponding to each phase, a number of execution targets in which an instance of the service is to be bootstrapped, or the like. In some embodiments, the flock configuration file 500 (or other flock configuration files corresponding to the same service) may include information from which one or more capabilities on which the service depends may be identified. In some embodiments, the flock configuration file 500 (or other flock configuration files corresponding to the same service) may indicate one or more capabilities to be posted upon bootstrapping the resources of that flock config. As a non-limiting example, flock configuration file 500 may be one of a set of configuration files corresponding to a same flock. One flock config corresponding to a flock may describe, via declarative statements, a desired state of one or more infrastructure resources. Another flock config corresponding to the flock may describe, via declarative statements, a desired state of one or more artifacts (e.g., software application). Another flock config (e.g., flock config 500) may identify resource discovery data. Phases and/or execution targets to which the flock applies may be identified in any suitable flock config described above. In the example provided in FIG. 5, any reference to the flock config 500 may be construed as referring to any suitable flock config of a set of flock configs if a set of flock configs are utilized to describe resources of the flock.

In some embodiments, code segment 502 may include resource discovery data that may be utilized to identify one or more previously existing resources. By way of example, the line 506 may indicate that data corresponding to a resource of type "dataType" and name "Resource_Name" is to be searched for. Type "dataType" and namd "Resource_Name" may be considered parameters of the resource discovery data defined by code segment 502. Lines 507-508 may each include additional parameters with which the search is to be conducted. For example, line 507 may include a parameter "ad" which, as decpited, may be populated with the name of each availability domain of a region (e.g., via a locally accessible array or list). Line 508 may include a parameter "compartment_id" which, as depicted, is populated with an identifier corresponding to every compartment of the region. Line 509 may define a string value (e.g., "EXAMPLE_RESOURCE") that may be used locally within flock config 500. The user of the string value defined at line 509 is discussed in further detail below.

As line 507 and 508 utilize a local parameter (e.g., indicated through the use of "local.", respectively), in some embodiments, region data values corresponding to the names of all of the availability domains of a given region and all compartment identifiers with the region may be injected within parameter "ad" and "compartment_id," respectively. The process in which the region data values are injected within local parameters is discussed in more detail in connection to U.S. Provisional Application No. 63/315, 024, filed Feb. 28, 2022, entitled "DATA MANAGEMENT TECHNIQUES FOR CLOUD REGIONS" (306000US), the contents of which are incorporated here in their entirety for all purposes. In the example depicted in FIG. 5, the set of parameters may include: type "dataType," name "Resource_Name," the availability domain names of the region, and the compartment identifiers for all of the compartments of the region.

Based at least in part on code segment 502, RH 420 may search every availability domain, in every compartment of that availability domain for resources that are associated with a data type "dataType," a name "Resource_Name." The parameter "data" may be utilized to access the resources identified, if any were found.

Code segment 504, as depicted, provides import operations to be executed with the resources identified using the parameters of code segment 502. RH 420 may be configured to execute any suitable operations defined with a declaration such as indicate in line 510 (e.g., output "default imports"). In the example depicted in code segment 504, at line 512, RH 420 may obtain a value for each resource identified as matching the set of parameters provided in code segment 502. The string "EXAMPLE_RESOURCE" may be utilized a string to replace a portion of line 510 (e.g., "example_resource") with "EXAMPLE_RESOURCE" as depicted at 511. In this manner, a global variable (e.g., a string, an integer, etc.) may be defined in code segment 502 and then utilized by any suitable portion of flock config 500 (e.g., code segment 504) as depicted at 511, 513, and 515.

For each resource, the value parameter at line 512 may be set to the value corresponding to data.EXAMPLE_RESOURCE.instance. Using the value for one resource, the operations of lines 514 and 516 may be executed. Line 514, when executed, may obtain the resource's address (e.g., an IP address). Line 516, when executed, may obtain an identifier for the resource. After executing lines 514 and 516 for each resource identified, RH 420 may have a list of the addresses and/or identifiers for every resource that was found to have attributes that matched the set of parameters of code segment 502. The RH 420 may store these address/identifiers in a record accessible to the MFO of FIG. 1-4, or the RH 420 may provide that data to MFO directly. Any suitable data obtained via import operations may be stored and/or provided to MFO in a similar manner. The example of address and identifier is not intended to limit this disclosure.

Figure 6:
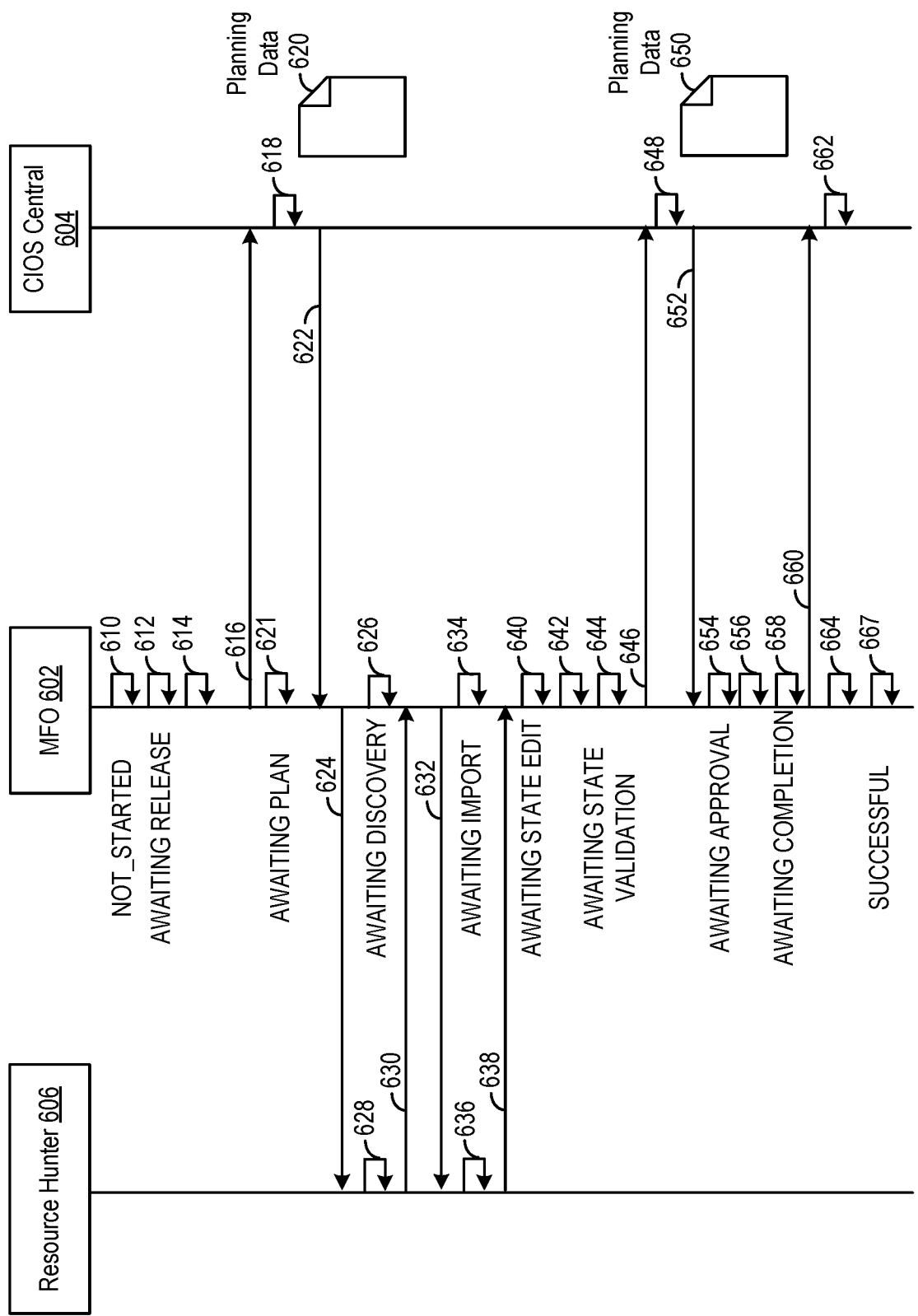
FIG. 6 is a block diagram depicting an example flow for identifying resources corresponding to a region build, according to at least one embodiment.

FIG. 6 is a block diagram depicting an example method 600 for identifying resources corresponding to a region build, according to at least one embodiment. MFO 602 may be an example of the Multi-Flock Orchestrator 104, 206, 310, and/or 404 of FIG. 1-4, respectively. CIOS Central 604 may be an example of the CIOS Central 108, 214, 304, and/or 404 of FIGS. 1-4, respectively. Resource Hunter 606 may be an example of the Resource Hunter 420 of FIG. 4. At least a portion of the operations performed by MFO 602 may be performed by the state manager 428 of FIG. 4.

Prior to execution of the method 600, operations for selecting flock configs and injecting those configs with real-time region data, performing a static flock analysis, and generating a Build Dependency Graph (e.g., the Build Dependency Graph 338 of FIG. 3), may already be performed. Referring to FIG. 3, steps 1-4, the user 302 can use any suitable interface hosted by CIOS Central 604 to update region data (e.g., to indicate a new region, for example, to add data associated with ViBE 316 of FIG. 3, the region data for ViBE 316 may indicate that ViBE 316 is a ViBE region). Through the operations discussed in connection with steps 1-4 of FIG. 3, MFO 602 may be informed and/or may detect the change in region data. As discussed in connection with step 5 of FIG. 3, MFO 602 may obtain a set of flock configs (e.g., a set of one or more flock configs for each service). The set of flock configs can be selected based at least in part on the Golden Version Set data maintained by MFO 602. As discussed in connection with steps 6-8 of FIG. 3, MFO 602 may request that CIOS Central 604 recompile the selected flocks. During that recompilation, current region data may be obtained from the Real-time Regional Data Distributor 306 and injected into the parameters of the flock config(s). MFO 602 may then perform a static analysis of the recompile flock configs to generate Build Dependency Graph 338 as discussed in connection with step 9 of FIG. 3.

Method 600 may begin at 610, where MFO 602 (e.g., state manager 428 of FIG. 4) may detect the existence of Build Dependency Graph 338 and may begin state management for a single pass of the Build Dependency Graph 338.

Figure 7:
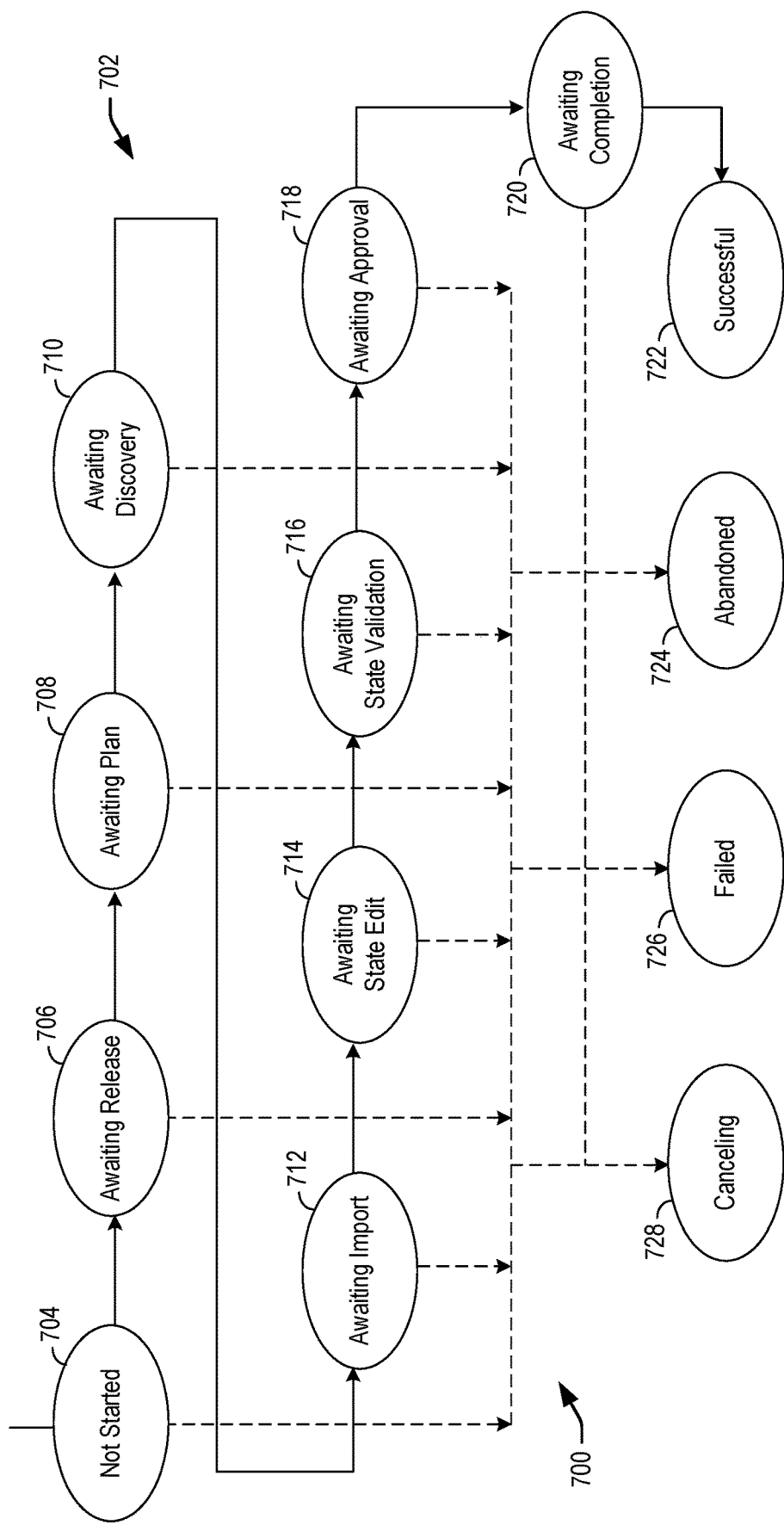
FIG. 7 depicts an example flow depicting a number of states with which execution of bootstrapping operations and/or resource discovery operations is orchestrated, according to at least one embodiment.

FIG. 7 depicts an example flow 700 depicting a number of states (e.g., collectively referred to as states 702) with which execution of bootstrapping operations and/or resource discovery operations is orchestrated, according to at least one embodiment. States 702 can include any suitable number of states (e.g., not_started state 704, awaiting_release state 706, awaiting_plan state 708, awaiting_discovery state 710, awaiting_import state 712, awaiting_state_edit state 714, awaiting_state_validation 716, awaiting_approval 718, awaiting_completion 720, successful state 722, abandoned state 724, failed state 726, and canceling state 728). The particular states depicted in FIG. 7 are not intended to limit the scope of this disclosure. More or fewer and/or different states may be used, not necessarily the specific ones depicted in FIG. 7. The specific states will be discussed in line with the example of FIG. 6.

Returning to FIG. 6, at 610, MFO 602 (e.g., state manager 428) may transition to a NOT_STARTED state (e.g., corresponding to not_started state 704 of FIG. 7). While in the NOT_STARTED state, MFO 602 may perform operations for determining a number of predefined conditions have been met. If those predefined conditions are met, MFO 602 (e.g., state manager 428) may transition the state to AWAITING_RELEASE at 612. The AWAITING_RELEASE state may correspond to the awaiting_release state 706 of FIG. 7.

At 614, while in the AWAITING_RELEASE state, MFO 602 may be configured to begin traversal of the Build Dependency Graph (e.g., the Build Dependency Graph 338 of FIG. 3). A first flock config may be selected corresponding to the starting node of the Build Dependency Graph. The first flock config may correspond to a unit of change to be made to the region in build (e.g., a unit of change within a data center). By way of example, considering the region in build is a ViBE region (e.g., ViBE region 316), the first flock config can be associated with bootstrapping the Capabilities Service 318 and Worker 320 of FIG. 3 (and similarly discussed in FIG. 2) within the ViBE region being built. The starting node may be the starting node by virtue of the corresponding flock config having no dependencies on other capabilities of the ViBE region being available.

At 616, the MFO 602 may send a set of instructions corresponding of a release of the first flock config. In some embodiments, MFO 602 may send a first request to CIOS Central 604 with the first flock config that, as previously discussed, includes injected region data. Once sent, MFO 602 (e.g., the state manager 428) may transition to state AWAITING_PLAN (corresponding to awaiting_plan state 708 of FIG. 7) at 621.

At 618, CIOS Central 604 may receive the flock config and may perform operations for planning the release. By way of example, CIOS Central 604 may attempt to ascertain the state of the resources in the first flock config within the ViBE region 316. CIOS Central 604 may identify that an instance of CIOS Regional and Deployment Orchestrator are needed to bootstrap the resources identified in the first flock config (e.g., Capabilities Service 318 and Worker 320). As the ViBE region 316 is new, CIOS Central 604 may identify that none of the resources needed for the flock exist. In response, CIOS Central 604 may generate planning data 620.

Figure 8:
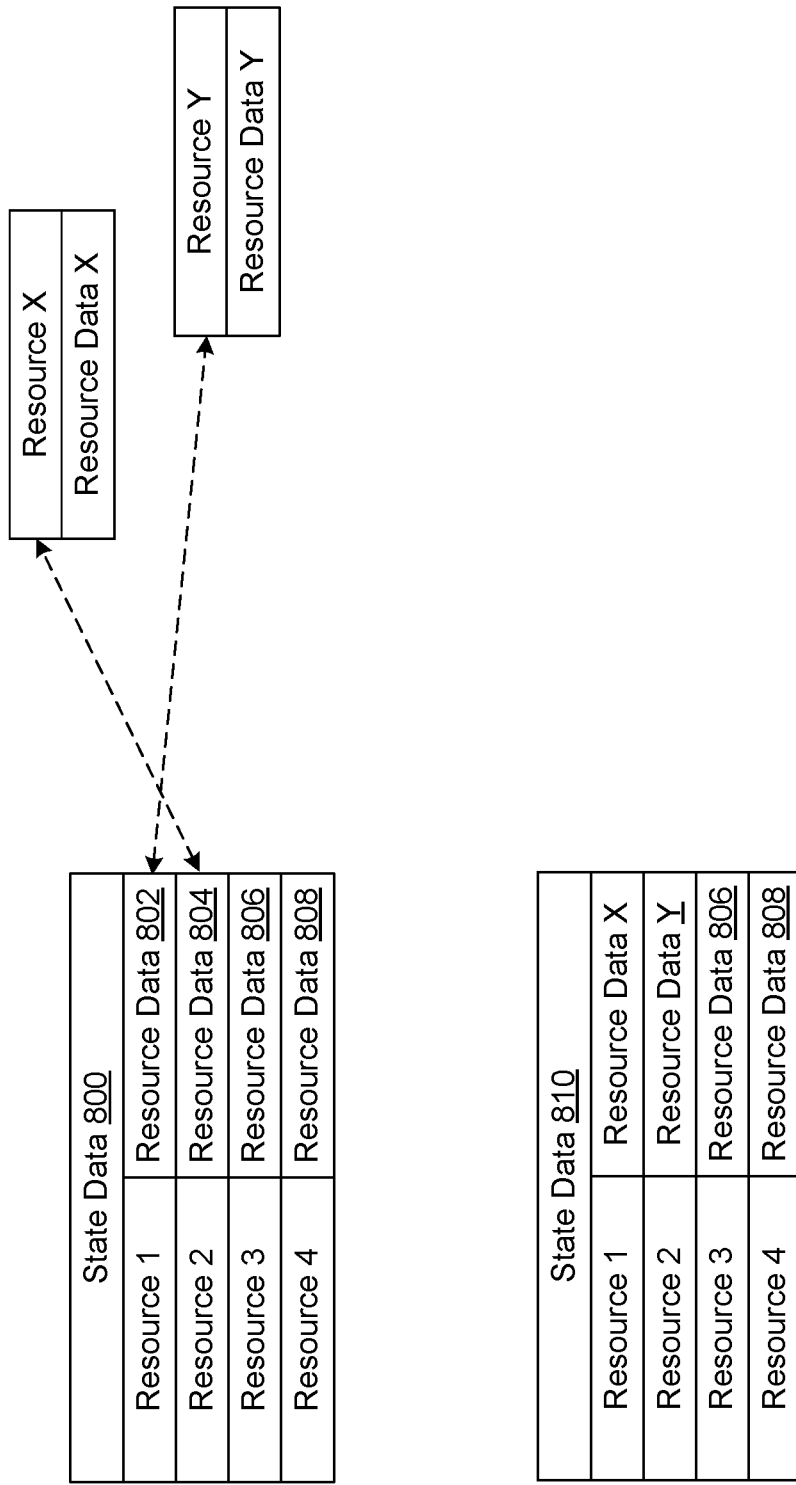
FIG. 8 is a block diagram depicting an example instance of state data, according to at least one embodiment.

FIG. 8 is a block diagram depicting an example instance of state data 800, according to at least one embodiment. State data 800 may be included as part of the planning data 620 of FIG. 6. As depicted in FIG. 8, state data 800 may include any suitable data corresponding to any suitable number of resources to be created. In the ongoing example of FIG. 6, state data 800 may indicate that an instance of CIOS Regional, an instance of Deployment Orchestrator, a Capabilities Service, and a Worker are to be deployed. Each of these components can correspond with resource 1, resource 2, resource 3, and resource 4 of state data 800, respectively. Any suitable corresponding resource data (e.g., resource data 802, 804, 806, and/808 may initially be included in state data 800). Returning to FIG. 6, Planning data 620 may be transmitted to MFO 602 at 622.

At 624, MFO 602 may, upon receiving planning data 620, send a request to Resource Hunter 606 (e.g., an example of Resource Hunter 420 of FIG. 4) to identify potential preexisting resources that may be leveraged for performing this release. At 626, MFO 602 (e.g., State Manager 428) may transition to state AWAITING_DISCOVERY (e.g., corresponding to awaiting_discovery state 710 of FIG. 7). As discussed above in connection with FIG. 5, the first flock config may include code segment 502 that defines a set of parameters with which resources are to be matched.

At 628, Resource Hunter 606 may extract the parameters from the resource discovery data provided in the first flock config (e.g., code segment 502). In some embodiments, Resource Hunter 606 may perform any suitable operations to query at a location specified by the resource discovery data (e.g., as defined in code segment 502, each AD, in each compartment, etc.) and/or with any suitable combination of the parameters provided (e.g., "dataType," "Resource_Name" as provided in code segment 502.

At 630, Resource Hunter 606 may transmit to MFO 602, any suitable data indicating any suitable number of resources identified as matching the resource discovery data. WO 602 may send another request at 632 to request that Resource Hunter 606 perform import operations.

At 634, upon receiving the data at 630, MFO 602 (e.g., the State Manager 428) may transition to state AWAITING_IMPORT corresponding to the awaiting_import state 714 of FIG. 7.

At 636, Resource Hunter 606 may be configured to identify a set of import operations to be performed. By way of example, Resource Hunter 606 may identify import operations from the first flock config within the resource discovery data provided. By way of example, Resource Hunter 606 may identify code segment 504 of FIG. 5 and execute the import operations identified. In the ongoing example, this may obtain any suitable data about the matching resources such as the address and resource identifier for each resource. In some embodiments, the first flock config for building the ViBE 316 may, in its resource discovery data, include locations and parameter(s) for identifying CIOS Regional 314 and Deployment Orchestrator 317 within Host Region 332 of FIG. 3. Referring once more to FIG. 8, Resource X and Resource Y may correspond to CIOS Regional 314 and Deployment Orchestrator 317, respectively. Resource data X may include any suitable attribute (e.g., address and resource identifier, etc.) of Resource X, while Resource data Y may include any suitable attribute (e.g., address and resource identifier, etc.) of Resource Y.

Returning to FIG. 6, at 638, Resource Hunter 606 may transmit the resource data obtained (e.g., the addresses and resource identifiers for CIOS Regional 314 and Deployment Orchestrator 317 of Host Region 332) to MFO 602.

At 640, upon receiving the data at 638, MFO 602 (e.g., the State Manager 428) may transition to state AWAITING_STATE_EDIT corresponding to the awaiting_state_edit state 716 of FIG. 7.

At 642, MFO 602 may perform operations for updating the state data of the planning data 620. Referring once more to FIG. 8, MFO 602 may modify at least a portion of resource data 802 with any suitable portion of resource data X (corresponding, in this example, to CIOS Regional 314). In the ongoing example, MFO 602 may modify resource data 802 to include the address and resource identifier obtained for CIOS Regional 314 within the Host Region 332. Similarly, MFO 602 may modify resource data 804 to include the address and resource identifier obtained for Deployment Orchestrator 317 within the Host Region 332. State Data 810 is intended to depict the modified version of State Data 800 after these operations are performed.

Returning to FIG. 6, at 644, MFO 602 (e.g., the State Manager 428) may transition to state AWAITING_STATE_VALIDATION corresponding to the awaiting_state_validation state 718 of FIG. 7.

At 646, MFO 602 may send the modified planning data including state data 810 of FIG. 8, to CIOS Central 604.

At 648, CIOS Central 604 may updated planning data and may perform operations for replanning the release using the updated planning data provided by MFO 602. Planning Data 650 may be generated as part of those operations. Planning Data 650 may identify resources to be created. In the ongoing example, CIOS Regional 314 and Deployment Orchestrator 317 either may not be included in the planning data 650, or if they are, the planning data 650 may indicate they are to be used instead of creating a new resource.

At 652, MFO 602 may receive the planning data 650 and may compare the planning data 650 to the state data it sent at 646 to determine whether the planning data 650 is in line with the requested state data. For example, MFO 602 may verify from the planning data 650 that CIOS Central 604 does not plan to generate a new instance of CIOS Regional, but rather intends to use the CIOS Regional 314 of Host Region 332. Similarly, MFO may verify from the planning data 650 that CIOS Central 604 does not plan to generate a new instance of Deployment Orchestrator 317, but rather intends to use the Deployment Orchestrator 317 of Host Region 332.

At 654, if the planning data 650 is in line with the state data sent at 646, MFO 602 (e.g., the State Manager 428) may transition to state AWAITING_APPROVAL corresponding to the awaiting_approval state 720 of FIG. 7. While in this state, any suitable operations may be performed for presenting the user (e.g., user 302 of FIG. 3, via any suitable user interface hosted by CIOS Central 604) any suitable portion of the planning data 650. In some embodiments, an indication may be received at 654 if the user approves. Alternatively, depending on an indication provided within the flock config, MFO 604 may automatically approve the planning data 650. Upon receiving an indication the planning data 650 is approved (e.g., automatically, or via user input), at 658, MFO 602 (e.g., the State Manager 428) may transition to state AWAITING_COMPLETION corresponding to the awaiting_completion state 720 of FIG. 7. Indication that the planning data 650 is approved may be transmitted at 660.

At 662, CIOS Central 604 may perform any suitable operations for bootstrapping the resources of the first flock config within the region in build (e.g., ViBE 316 of FIG. 3). By way of example CIOS Centra 604 may instruct (in light of the planning data 650) CIOS Regional 314 to bootstrap Capabilities Service 318 of FIG. 3 and Worker 320 of FIG. 3. When Capabilities Service 318 is operational, it may be configured to publish a capability indicating the same.

At 664, MFO 602 may receive (or otherwise obtain) an indication that the capability corresponding to the Capabilities Service 318 has been published. In response, to identifying that the published capability is identified in the flock config, the MFO 602 (e.g., the State Manager 428) may transition, at 667, to state SUCCESSFUL corresponding to the awaiting_completion state 720 of FIG. 7.

This may conclude a single pass (also called a "release") of a flock config to the region (e.g., the ViBE 316). Once the successful state is reached, MFO 602 may be configured to resume traversal of the Build Dependency Graph 338 to identify the next release/pass. This process may be performed any suitable times, the specific flock configs can include any suitable discovery data with which resources of the region (or another region) may be imported and utilized (e.g., by the CIOS Regional in that region).

A similar process may be performed to deploy an instance of Capabilities Service, Deployment Orchestrator, CIOS Regional, and Worker in a Target Region. Once the user added the region data corresponding to the Target Region (e.g., Target Region 334), a different set of flock configs would be identified by MFO. Any suitable portion of these flock configs may include resource discovery data that, at times, may cause MFO 602 to instruct CIOS Central that resources of the ViBE are to be used for bootstrapping operations performed for the Target Region.

Returning to FIG. 7 briefly, it should be appreciated that State Manager 428 may monitor for various conditions (e.g., user input, timeouts, error codes, etc.) to identify when to transition to any of states 724-728. In some embodiments, the State Manager 428 may transition to any of states 724-728 from any of states 704-720 at any suitable time based at least in part on detecting a predefined condition (e.g., the data on which MFO is waiting has not been received in a predefined period of time).

Figure 9:
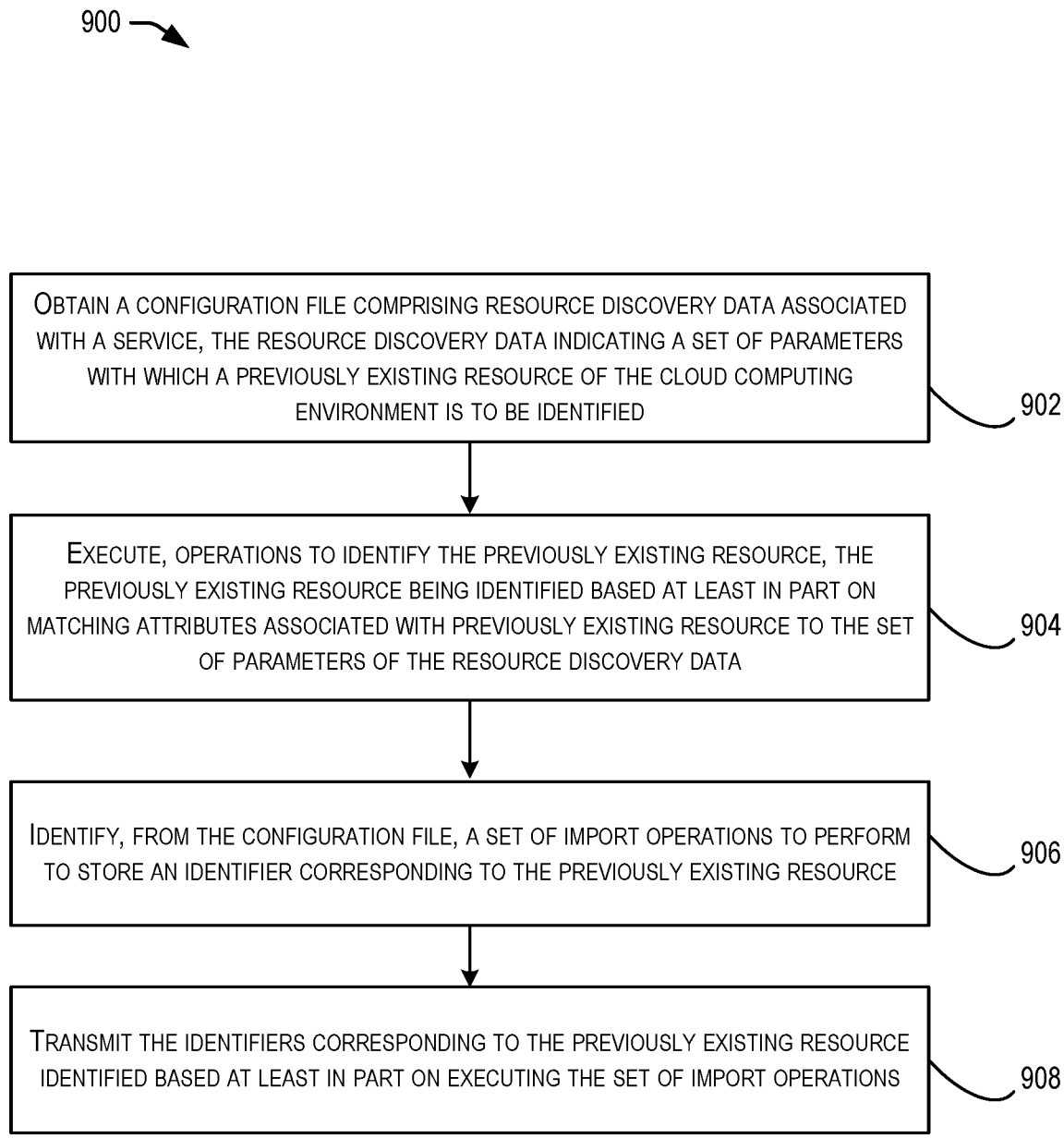
FIG. 9 illustrates an example method for discovering previously existing resources, according to at least one embodiment.

FIG. 9 illustrates an example method 900 for discovering previously existing resources, according to at least one embodiment. The method 900 may be performed by one or more components of a cloud-computing environment (e.g., the Cloud Infrastructure Orchestration Service 402 of FIG. 4). For example, the method 900 may be performed, at least in part, by a resource identification service (e.g., the Resource Hunter of FIGS. 4 and/or 6). A computer-readable storage medium comprising computer-readable instructions that, upon execution by one or more processors of a computing device, cause the computing device to perform the method 900. The method 900 may performed in any suitable order or in parallel. It should be appreciated that the method 900 may include a greater number or a lesser number of steps than that depicted in FIG. 9.

The method 900 may begin at 902, where a flock configuration file (e.g., flock configuration file 500) comprising resource discovery data associated with a service may be obtained (e.g., by a resource identification service such as the Resource Hunter 420 of FIG. 4 and/or the Resource Hunter 606 of FIG. 6). In some embodiments, the resource discovery data may indicate a set of parameters with which a previously existing resource of the cloud computing environment is to be identified. For example, FIG. 5 includes code segment 502 that may include such parameters as discussed above in connection with FIG. 5.

At 904, operations to identify the previously existing resource may be executed. In some embodiments, the previously existing resource (e.g., CIOS Regional 314 as discussed in the example of FIG. 6) may be identified based at least in part on matching attributes associated with previously existing resource to the set of parameters of the resource discovery data.

At 906, a set of import operations to perform to obtain an identifier corresponding to the previously existing resource may be identified. By way of example, FIG. 5 includes code segment 504 that may include example import operations as discussed above in connection with FIG. 5.

At 908, the identifiers corresponding to the previously existing resource identified may be transmitted (e.g., to MFO 602 of FIG. 6) based at least in part on executing the set of import operations.

Figure 10:
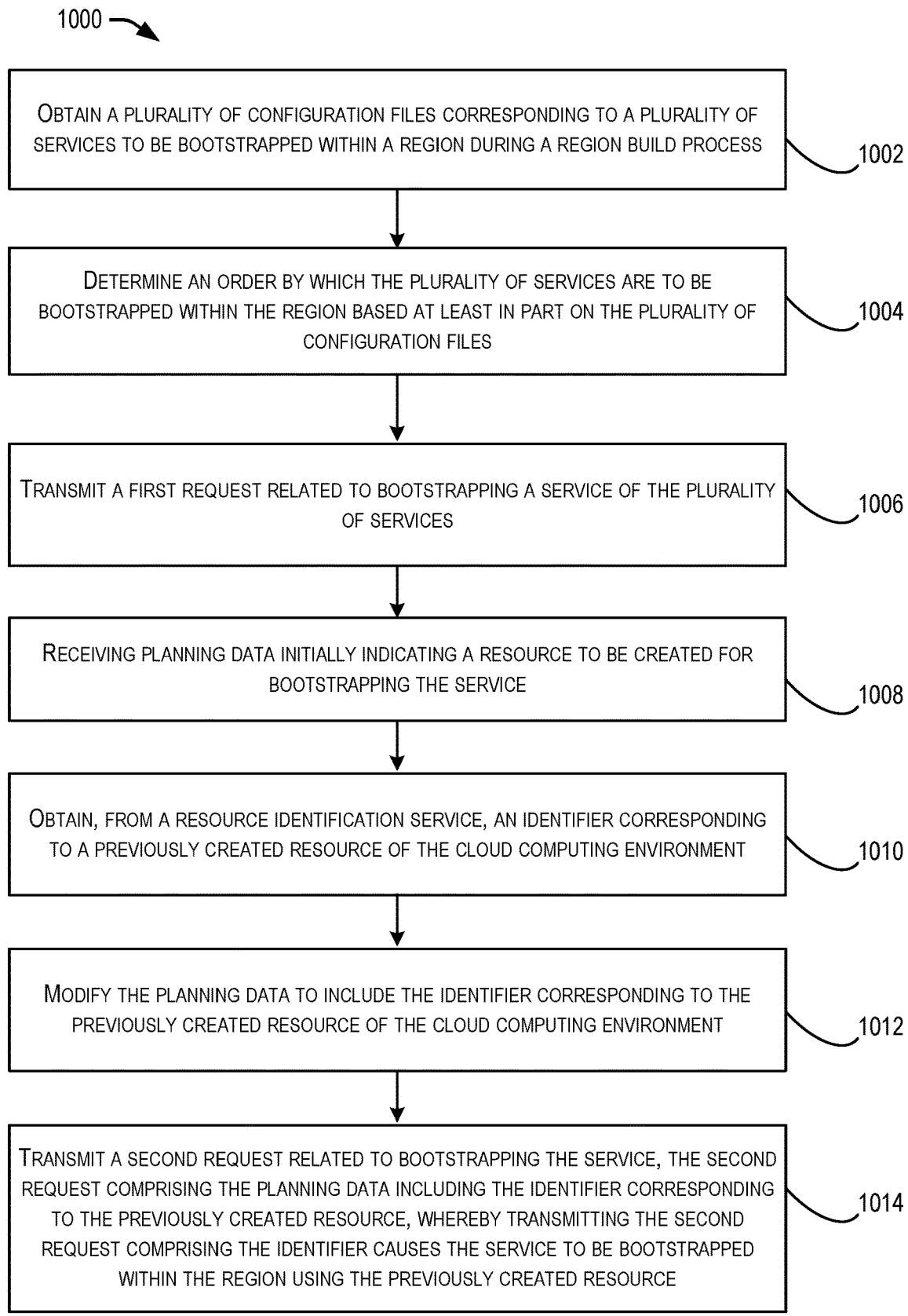
FIG. 10 illustrates an example method for utilizing previously existing resources to execute a region build, according to at least one embodiment.

FIG. 10 illustrates an example method 1000 for utilizing previously existing resources to execute a region build, according to at least one embodiment. The method 1000 may be performed by one or more components of the Cloud Infrastructure Orchestration Service 102 of FIG. 1 (e.g., an orchestration service such as the Multi-Flock Orchestrator of FIGS. 1-4 and/or 6). A computer-readable storage medium comprising computer-readable instructions that, upon execution by one or more processors of a computing device, cause the computing device to perform the method 1000. The method 1000 may performed in any suitable order. It should be appreciated that the method 1000 may include a greater number or a lesser number of steps than that depicted in FIG. 10.

The method 1000 may begin at 1002, where a plurality of flock configuration files corresponding to a plurality of services may be obtained. In some embodiments, the plurality of services being ones to be bootstrapped within a region during a region build process.

At 1004, an order by which the plurality of services are to be bootstrapped within the region may be determined based at least in part on the plurality of flock configuration files. For example, a static analysis of the plurality of clock configuration files can be performed to generated Build Dependency Graph 338 which identifies the order by which flock configs are to be released to bootstrap the plurality of services within the region.

At 1006, a first request related to bootstrapping a service of the plurality of services may be transmitted. The first request may include a flock configuration file corresponding to a first flock config. These operations may correspond to step 616 of FIG. 6.

At 1008, planning data (e.g., planning data 620 of FIG. 6) initially indicating a resource to be created for bootstrapping the service may be received (e.g., from CIOS Central 604 of FIG. 6).

At 1010, an identifier corresponding to a previously created resource of the cloud computing environment may be obtained (e.g., from the Resource Discovery Service 606 of FIG. 6). By way of example, the address and resource identifier for CIOS Regional 314 may be received as described at step 638 of FIG. 6.

At 1012, the planning data may be modified to include the identifier corresponding to the previously created resource of the cloud computing environment. An example of modified planning data may include state data 810 of FIG. 8.

At 1014, a second request related to bootstrapping the service may be transmitted (e.g., to CIOS Central 604). In some embodiments, the second request comprises the planning data including the identifier corresponding to the previously created resource. Transmitting the second request comprising the identifier may cause the service to be bootstrapped within the region using the previously created resource in the manner described in connection with FIG. 6.

Example Cloud Service Infrastructure Architecture

As noted above, infrastructure as a service (IaaS) is one particular type of cloud computing. IaaS can be configured to provide virtualized computing resources over a public network (e.g., the Internet). In an IaaS model, a cloud-computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (e.g., billing, monitoring, logging, load balancing and clustering, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud-computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different challenges for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 11:
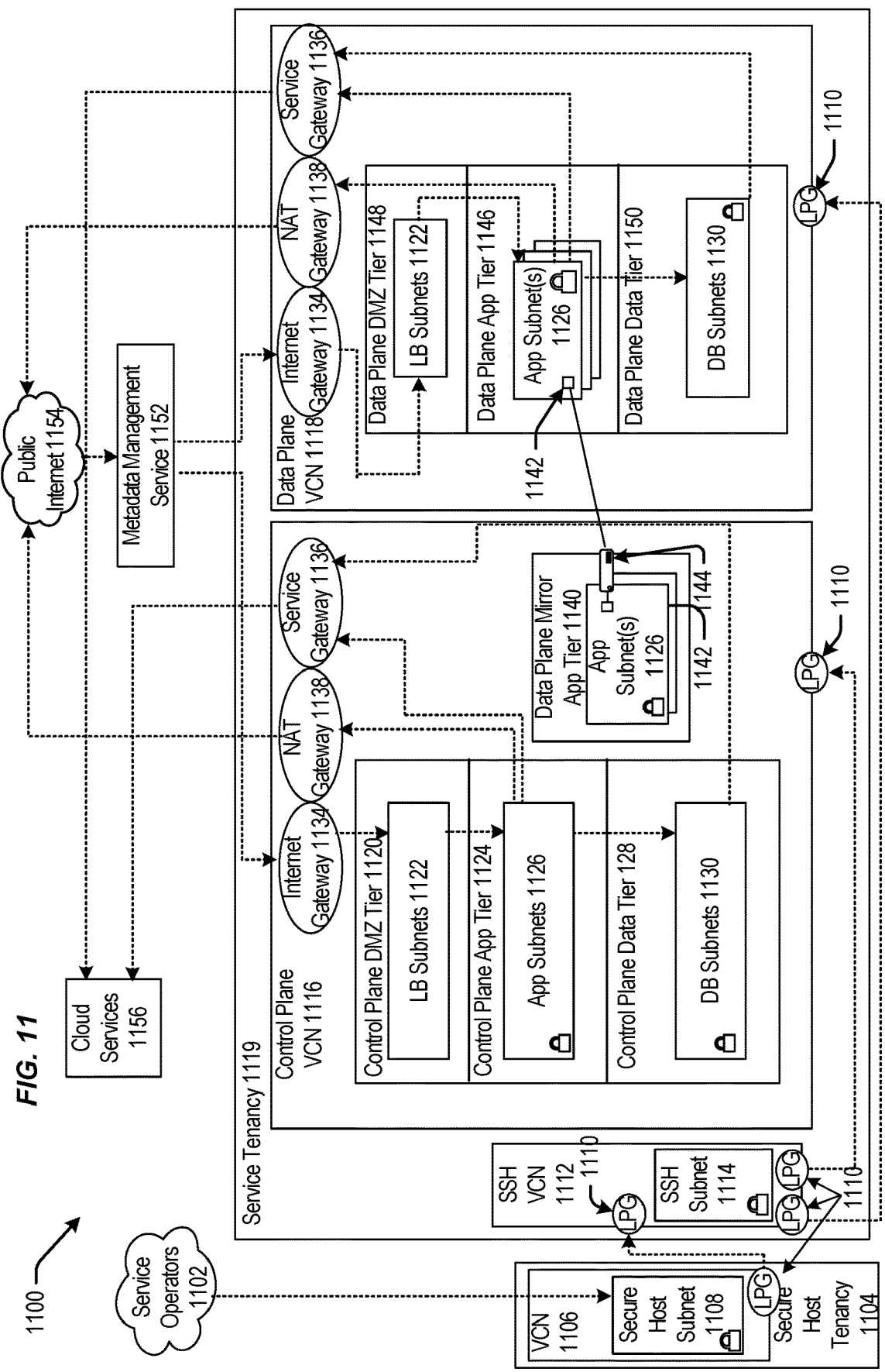
FIG. 11 is a block diagram illustrating one pattern for implementing a cloud infrastructure as a service system, according to at least one embodiment.

FIG. 11 is a block diagram 1100 illustrating an example pattern of an IaaS architecture, according to at least one embodiment. Service operators 1102 can be communicatively coupled to a secure host tenancy 1104 that can include a virtual cloud network (VCN) 1106 and a secure host subnet 1108. In some examples, the service operators 1102 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 1106 and/or the Internet.

The VCN 1106 can include a local peering gateway (LPG) 1110 that can be communicatively coupled to a secure shell (SSH) VCN 1112 via an LPG 1110 contained in the SSH VCN 1112. The SSH VCN 1112 can include an SSH subnet 1114, and the SSH VCN 1112 can be communicatively coupled to a control plane VCN 1116 via the LPG 1110 contained in the control plane VCN 1116. Also, the SSH VCN 1112 can be communicatively coupled to a data plane VCN 1118 via an LPG 1110. The control plane VCN 1116 and the data plane VCN 1118 can be contained in a service tenancy 1119 that can be owned and/or operated by the IaaS provider.

The control plane VCN 1116 can include a control plane demilitarized zone (DMZ) tier 1120 that acts as a perimeter network (e.g., portions of a corporate network between the corporate intranet and external networks). The DMZ-based servers may have restricted responsibilities and help keep breaches contained. Additionally, the DMZ tier 1120 can include one or more load balancer (LB) subnet(s) 1122, a control plane app tier 1124 that can include app subnet(s) 1126, a control plane data tier 1128 that can include database (DB) subnet(s) 1130 (e.g., frontend DB subnet(s) and/or backend DB subnet(s)). The LB subnet(s) 1122 contained in the control plane DMZ tier 1120 can be communicatively coupled to the app subnet(s) 1126 contained in the control plane app tier 1124 and an Internet gateway 1134 that can be contained in the control plane VCN 1116, and the app subnet(s) 1126 can be communicatively coupled to the DB subnet(s) 1130 contained in the control plane data tier 1128 and a service gateway 1136 and a network address translation (NAT) gateway 1138. The control plane VCN 1116 can include the service gateway 1136 and the NAT gateway 1138.

The control plane VCN 1116 can include a data plane mirror app tier 1140 that can include app subnet(s) 1126. The app subnet(s) 1126 contained in the data plane mirror app tier 1140 can include a virtual network interface controller (VNIC) 1142 that can execute a compute instance 1144. The compute instance 1144 can communicatively couple the app subnet(s) 1126 of the data plane mirror app tier 1140 to app subnet(s) 1126 that can be contained in a data plane app tier 1146.

The data plane VCN 1118 can include the data plane app tier 1146, a data plane DMZ tier 1148, and a data plane data tier 1150. The data plane DMZ tier 1148 can include LB subnet(s) 1122 that can be communicatively coupled to the app subnet(s) 1126 of the data plane app tier 1146 and the Internet gateway 1134 of the data plane VCN 1118. The app subnet(s) 1126 can be communicatively coupled to the service gateway 1136 of the data plane VCN 1118 and the NAT gateway 1138 of the data plane VCN 1118. The data plane data tier 1150 can also include the DB subnet(s) 1130 that can be communicatively coupled to the app subnet(s) 1126 of the data plane app tier 1146.

The Internet gateway 1134 of the control plane VCN 1116 and of the data plane VCN 1118 can be communicatively coupled to a metadata management service 1152 that can be communicatively coupled to public Internet 1154. Public Internet 1154 can be communicatively coupled to the NAT gateway 1138 of the control plane VCN 1116 and of the data plane VCN 1118. The service gateway 1136 of the control plane VCN 1116 and of the data plane VCN 1118 can be communicatively couple to cloud services 1156.

In some examples, the service gateway 1136 of the control plane VCN 1116 or of the data plane VCN 1118 can make application programming interface (API) calls to cloud services 1156 without going through public Internet 1154. The API calls to cloud services 1156 from the service gateway 1136 can be one-way: the service gateway 1136 can make API calls to cloud services 1156, and cloud services 1156 can send requested data to the service gateway 1136. But, cloud services 1156 may not initiate API calls to the service gateway 1136.

In some examples, the secure host tenancy 1104 can be directly connected to the service tenancy 1119, which may be otherwise isolated. The secure host subnet 1108 can communicate with the SSH subnet 1114 through an LPG 1110 that may enable two-way communication over an otherwise isolated system. Connecting the secure host subnet 1108 to the SSH subnet 1114 may give the secure host subnet 1108 access to other entities within the service tenancy 1119.

The control plane VCN 1116 may allow users of the service tenancy 1119 to set up or otherwise provision desired resources. Desired resources provisioned in the control plane VCN 1116 may be deployed or otherwise used in the data plane VCN 1118. In some examples, the control plane VCN 1116 can be isolated from the data plane VCN 1118, and the data plane mirror app tier 1140 of the control plane VCN 1116 can communicate with the data plane app tier 1146 of the data plane VCN 1118 via VNICs 1142 that can be contained in the data plane mirror app tier 1140 and the data plane app tier 1146.

In some examples, users of the system, or customers, can make requests, for example create, read, update, or delete (CRUD) operations, through public Internet 1154 that can communicate the requests to the metadata management service 1152. The metadata management service 1152 can communicate the request to the control plane VCN 1116 through the Internet gateway 1134. The request can be received by the LB subnet(s) 1122 contained in the control plane DMZ tier 1120. The LB subnet(s) 1122 may determine that the request is valid, and in response to this determination, the LB subnet(s) 1122 can transmit the request to app subnet(s) 1126 contained in the control plane app tier 1124. If the request is validated and requires a call to public Internet 1154, the call to public Internet 1154 may be transmitted to the NAT gateway 1138 that can make the call to public Internet 1154. Memory that may be desired to be stored by the request can be stored in the DB subnet(s) 1130.

In some examples, the data plane mirror app tier 1140 can facilitate direct communication between the control plane VCN 1116 and the data plane VCN 1118. For example, changes, updates, or other suitable modifications to configuration may be desired to be applied to the resources contained in the data plane VCN 1118. Via a VNIC 1142, the control plane VCN 1116 can directly communicate with, and can thereby execute the changes, updates, or other suitable modifications to configuration to, resources contained in the data plane VCN 1118.

In some embodiments, the control plane VCN 1116 and the data plane VCN 1118 can be contained in the service tenancy 1119. In this case, the user, or the customer, of the system may not own or operate either the control plane VCN 1116 or the data plane VCN 1118. Instead, the IaaS provider may own or operate the control plane VCN 1116 and the data plane VCN 1118, both of which may be contained in the service tenancy 1119. This embodiment can enable isolation of networks that may prevent users or customers from interacting with other users', or other customers', resources. Also, this embodiment may allow users or customers of the system to store databases privately without needing to rely on public Internet 1154, which may not have a desired level of threat prevention, for storage.

In other embodiments, the LB subnet(s) 1122 contained in the control plane VCN 1116 can be configured to receive a signal from the service gateway 1136. In this embodiment, the control plane VCN 1116 and the data plane VCN 1118 may be configured to be called by a customer of the IaaS provider without calling public Internet 1154. Customers of the IaaS provider may desire this embodiment since database(s) that the customers use may be controlled by the IaaS provider and may be stored on the service tenancy 1119, which may be isolated from public Internet 1154.

Figure 12:
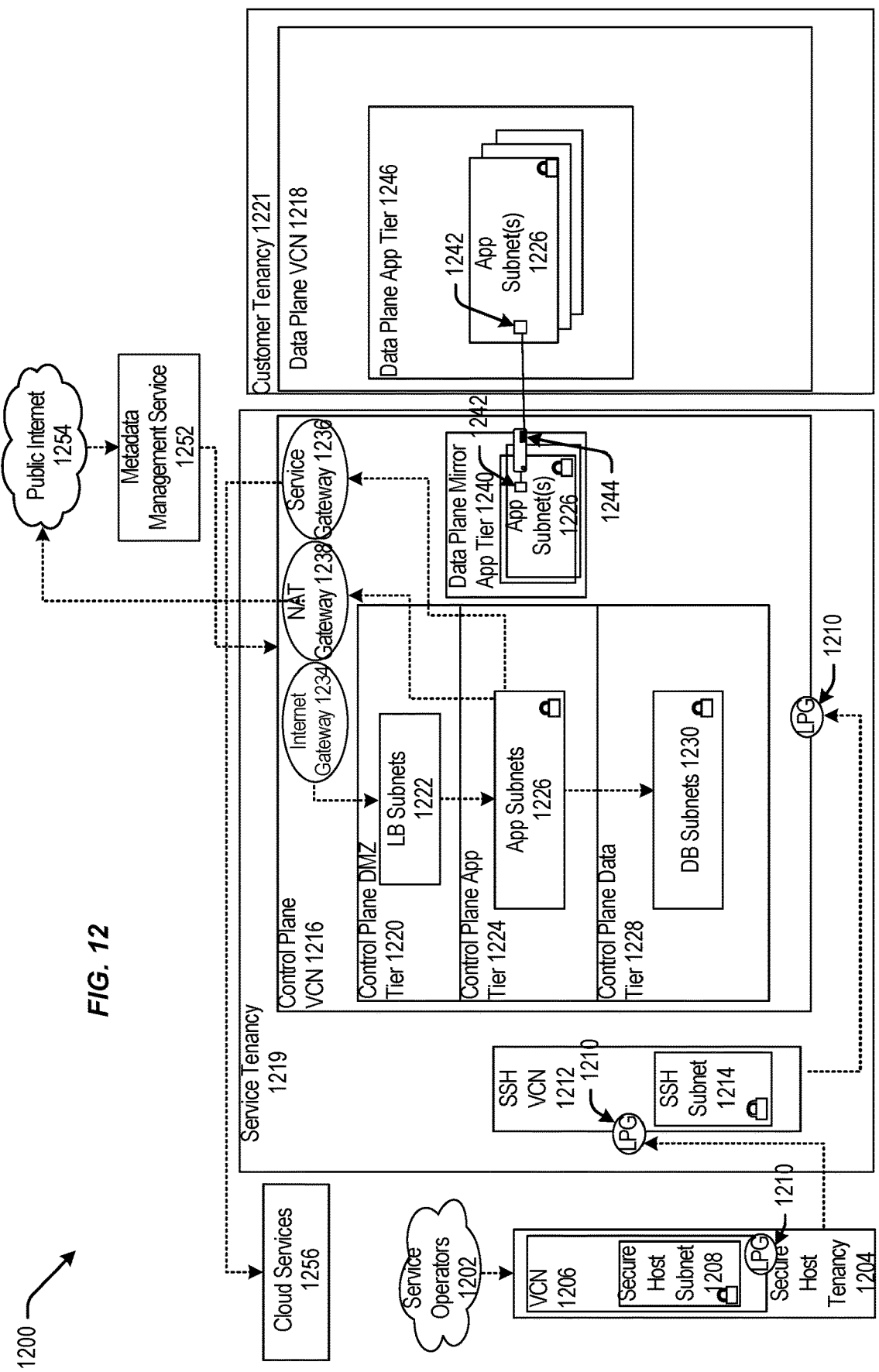
FIG. 12 is a block diagram illustrating another pattern for implementing a cloud infrastructure as a service system, according to at least one embodiment.

FIG. 12 is a block diagram 1200 illustrating another example pattern of an IaaS architecture, according to at least one embodiment. Service operators 1202 (e.g., service operators 1102 of FIG. 11) can be communicatively coupled to a secure host tenancy 1204 (e.g., the secure host tenancy 1104 of FIG. 11) that can include a virtual cloud network (VCN) 1206 (e.g., the VCN 1106 of FIG. 11) and a secure host subnet 1208 (e.g., the secure host subnet 1108 of FIG. 11). The VCN 1206 can include a local peering gateway (LPG) 1210 (e.g., the LPG 1110 of FIG. 11) that can be communicatively coupled to a secure shell (SSH) VCN 1212 (e.g., the SSH VCN 1112 of FIG. 11) via an LPG 1110 contained in the SSH VCN 1212. The SSH VCN 1212 can include an SSH subnet 1214 (e.g., the SSH subnet 1114 of FIG. 11), and the SSH VCN 1212 can be communicatively coupled to a control plane VCN 1216 (e.g., the control plane VCN 1116 of FIG. 11) via an LPG 1210 contained in the control plane VCN 1216. The control plane VCN 1216 can be contained in a service tenancy 1219 (e.g., the service tenancy 1119 of FIG. 11), and the data plane VCN 1218 (e.g., the data plane VCN 1118 of FIG. 11) can be contained in a customer tenancy 1221 that may be owned or operated by users, or customers, of the system.

The control plane VCN 1216 can include a control plane DMZ tier 1220 (e.g., the control plane DMZ tier 1120 of FIG. 11) that can include LB subnet(s) 1222 (e.g., LB subnet(s) 1122 of FIG. 11), a control plane app tier 1224 (e.g., the control plane app tier 1124 of FIG. 11) that can include app subnet(s) 1226 (e.g., app subnet(s) 1126 of FIG. 11), a control plane data tier 1228 (e.g., the control plane data tier 1128 of FIG. 11) that can include database (DB) subnet(s) 1230 (e.g., similar to DB subnet(s) 1130 of FIG. 11). The LB subnet(s) 1222 contained in the control plane DMZ tier 1220 can be communicatively coupled to the app subnet(s) 1226 contained in the control plane app tier 1224 and an Internet gateway 1234 (e.g., the Internet gateway 1134 of FIG. 11) that can be contained in the control plane VCN 1216, and the app subnet(s) 1226 can be communicatively coupled to the DB subnet(s) 1230 contained in the control plane data tier 1228 and a service gateway 1236 (e.g., the service gateway 1136 of FIG. 11) and a network address translation (NAT) gateway 1238 (e.g., the NAT gateway 1138 of FIG. 11). The control plane VCN 1216 can include the service gateway 1236 and the NAT gateway 1238.

The control plane VCN 1216 can include a data plane mirror app tier 1240 (e.g., the data plane mirror app tier 1140 of FIG. 11) that can include app subnet(s) 1226. The app subnet(s) 1226 contained in the data plane mirror app tier 1240 can include a virtual network interface controller (VNIC) 1242 (e.g., the VNIC of 1142) that can execute a compute instance 1244 (e.g., similar to the compute instance 1144 of FIG. 11). The compute instance 1244 can facilitate communication between the app subnet(s) 1226 of the data plane mirror app tier 1240 and the app subnet(s) 1226 that can be contained in a data plane app tier 1246 (e.g., the data plane app tier 1146 of FIG. 11) via the VNIC 1242 contained in the data plane mirror app tier 1240 and the VNIC 1242 contained in the data plane app tier 1246.

The Internet gateway 1234 contained in the control plane VCN 1216 can be communicatively coupled to a metadata management service 1252 (e.g., the metadata management service 1152 of FIG. 11) that can be communicatively coupled to public Internet 1254 (e.g., public Internet 1154 of FIG. 11). Public Internet 1254 can be communicatively coupled to the NAT gateway 1238 contained in the control plane VCN 1216. The service gateway 1236 contained in the control plane VCN 1216 can be communicatively couple to cloud services 1256 (e.g., cloud services 1156 of FIG. 11).

In some examples, the data plane VCN 1218 can be contained in the customer tenancy 1221. In this case, the IaaS provider may provide the control plane VCN 1216 for each customer, and the IaaS provider may, for each customer, set up a unique compute instance 1244 that is contained in the service tenancy 1219. Each compute instance 1244 may allow communication between the control plane VCN 1216, contained in the service tenancy 1219, and the data plane VCN 1218 that is contained in the customer tenancy 1221. The compute instance 1244 may allow resources, that are provisioned in the control plane VCN 1216 that is contained in the service tenancy 1219, to be deployed or otherwise used in the data plane VCN 1218 that is contained in the customer tenancy 1221.

In other examples, the customer of the IaaS provider may have databases that live in the customer tenancy 1221. In this example, the control plane VCN 1216 can include the data plane mirror app tier 1240 that can include app subnet(s) 1226. The data plane mirror app tier 1240 can reside in the data plane VCN 1218, but the data plane mirror app tier 1240 may not live in the data plane VCN 1218. That is, the data plane mirror app tier 1240 may have access to the customer tenancy 1221, but the data plane mirror app tier 1240 may not exist in the data plane VCN 1218 or be owned or operated by the customer of the IaaS provider. The data plane mirror app tier 1240 may be configured to make calls to the data plane VCN 1218 but may not be configured to make calls to any entity contained in the control plane VCN 1216. The customer may desire to deploy or otherwise use resources in the data plane VCN 1218 that are provisioned in the control plane VCN 1216, and the data plane mirror app tier 1240 can facilitate the desired deployment, or other usage of resources, of the customer.

In some embodiments, the customer of the IaaS provider can apply filters to the data plane VCN 1218. In this embodiment, the customer can determine what the data plane VCN 1218 can access, and the customer may restrict access to public Internet 1254 from the data plane VCN 1218. The IaaS provider may not be able to apply filters or otherwise control access of the data plane VCN 1218 to any outside networks or databases. Applying filters and controls by the customer onto the data plane VCN 1218, contained in the customer tenancy 1221, can help isolate the data plane VCN 1218 from other customers and from public Internet 1254.

In some embodiments, cloud services 1256 can be called by the service gateway 1236 to access services that may not exist on public Internet 1254, on the control plane VCN 1216, or on the data plane VCN 1218. The connection between cloud services 1256 and the control plane VCN 1216 or the data plane VCN 1218 may not be live or continuous. Cloud services 1256 may exist on a different network owned or operated by the IaaS provider. Cloud services 1256 may be configured to receive calls from the service gateway 1236 and may be configured to not receive calls from public Internet 1254. Some cloud services 1256 may be isolated from other cloud services 1256, and the control plane VCN 1216 may be isolated from cloud services 1256 that may not be in the same region as the control plane VCN 1216. For example, the control plane VCN 1216 may be located in "Region 1," and cloud service "Deployment 11," may be located in Region 1 and in "Region 2." If a call to Deployment 11 is made by the service gateway 1236 contained in the control plane VCN 1216 located in Region 1, the call may be transmitted to Deployment 11 in Region 1. In this example, the control plane VCN 1216, or Deployment 11 in Region 1, may not be communicatively coupled to, or otherwise in communication with, Deployment 11 in Region 2.

Figure 13:
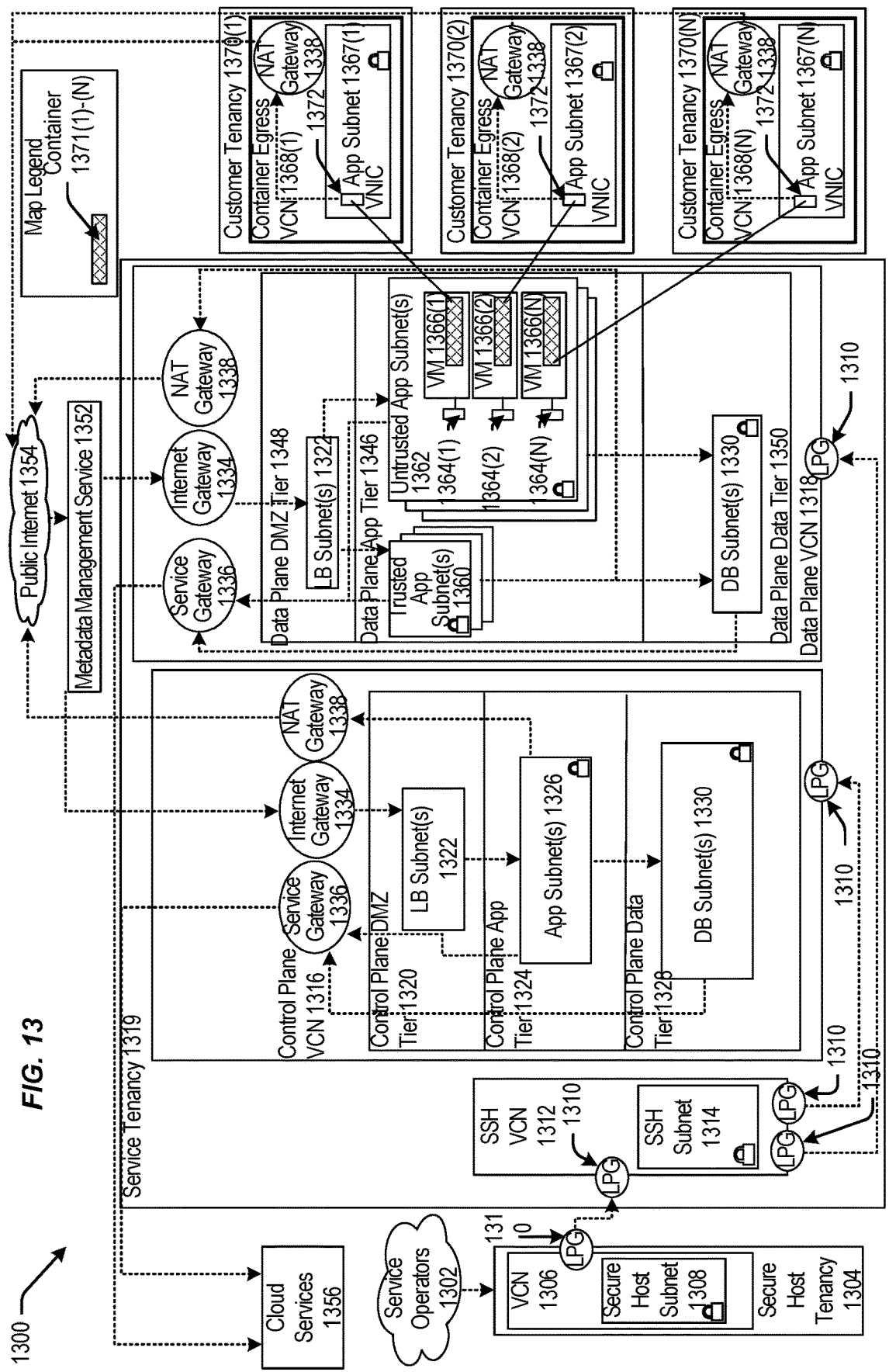
FIG. 13 is a block diagram illustrating another pattern for implementing a cloud infrastructure as a service system, according to at least one embodiment.

FIG. 13 is a block diagram 1300 illustrating another example pattern of an IaaS architecture, according to at least one embodiment. Service operators 1302 (e.g., service operators 1102 of FIG. 11) can be communicatively coupled to a secure host tenancy 1304 (e.g., the secure host tenancy 1104 of FIG. 11) that can include a virtual cloud network (VCN) 1306 (e.g., the VCN 1106 of FIG. 11) and a secure host subnet 1308 (e.g., the secure host subnet 1108 of FIG. 11). The VCN 1306 can include an LPG 1310 (e.g., the LPG 1110 of FIG. 11) that can be communicatively coupled to an SSH VCN 1312 (e.g., the SSH VCN 1112 of FIG. 11) via an LPG 1310 contained in the SSH VCN 1312. The SSH VCN 1312 can include an SSH subnet 1314 (e.g., the SSH subnet 1114 of FIG. 11), and the SSH VCN 1312 can be communicatively coupled to a control plane VCN 1316 (e.g., the control plane VCN 1116 of FIG. 11) via an LPG 1310 contained in the control plane VCN 1316 and to a data plane VCN 1318 (e.g., the data plane 1118 of FIG. 11) via an LPG 1310 contained in the data plane VCN 1318. The control plane VCN 1316 and the data plane VCN 1318 can be contained in a service tenancy 1319 (e.g., the service tenancy 1119 of FIG. 11).

The control plane VCN 1316 can include a control plane DMZ tier 1320 (e.g., the control plane DMZ tier 1120 of FIG. 11) that can include load balancer (LB) subnet(s) 1322 (e.g., LB subnet(s) 1122 of FIG. 11), a control plane app tier 1324 (e.g., the control plane app tier 1124 of FIG. 11) that can include app subnet(s) 1326 (e.g., similar to app subnet(s) 1126 of FIG. 11), a control plane data tier 1328 (e.g., the control plane data tier 1128 of FIG. 11) that can include DB subnet(s) 1330. The LB subnet(s) 1322 contained in the control plane DMZ tier 1320 can be communicatively coupled to the app subnet(s) 1326 contained in the control plane app tier 1324 and to an Internet gateway 1334 (e.g., the Internet gateway 1134 of FIG. 11) that can be contained in the control plane VCN 1316, and the app subnet(s) 1326 can be communicatively coupled to the DB subnet(s) 1330 contained in the control plane data tier 1328 and to a service gateway 1336 (e.g., the service gateway of FIG. 11) and a network address translation (NAT) gateway 1338 (e.g., the NAT gateway 1138 of FIG. 11). The control plane VCN 1316 can include the service gateway 1336 and the NAT gateway 1338.

The data plane VCN 1318 can include a data plane app tier 1346 (e.g., the data plane app tier 1146 of FIG. 11), a data plane DMZ tier 1348 (e.g., the data plane DMZ tier 1148 of FIG. 11), and a data plane data tier 1350 (e.g., the data plane data tier 1150 of FIG. 11). The data plane DMZ tier 1348 can include LB subnet(s) 1322 that can be communicatively coupled to trusted app subnet(s) 1360 and untrusted app subnet(s) 1362 of the data plane app tier 1346 and the Internet gateway 1334 contained in the data plane VCN 1318. The trusted app subnet(s) 1360 can be communicatively coupled to the service gateway 1336 contained in the data plane VCN 1318, the NAT gateway 1338 contained in the data plane VCN 1318, and DB subnet(s) 1330 contained in the data plane data tier 1350. The untrusted app subnet(s) 1362 can be communicatively coupled to the service gateway 1336 contained in the data plane VCN 1318 and DB subnet(s) 1330 contained in the data plane data tier 1350. The data plane data tier 1350 can include DB subnet(s) 1330 that can be communicatively coupled to the service gateway 1336 contained in the data plane VCN 1318.

The untrusted app subnet(s) 1362 can include one or more primary VNICs 1364(1)-(N) that can be communicatively coupled to tenant virtual machines (VMs) 1366(1)-(N). Each tenant VM 1366(1)-(N) can be communicatively coupled to a respective app subnet 1367(1)-(N) that can be contained in respective container egress VCNs 1368(1)-(N) that can be contained in respective customer tenancies 1370(1)-(N). Respective secondary VNICs 1372(1)-(N) can facilitate communication between the untrusted app subnet(s) 1362 contained in the data plane VCN 1318 and the app subnet contained in the container egress VCNs 1368(1)-(N). Each container egress VCNs 1368(1)-(N) can include a NAT gateway 1338 that can be communicatively coupled to public Internet 1354 (e.g., public Internet 1154 of FIG. 11).

The Internet gateway 1334 contained in the control plane VCN 1316 and contained in the data plane VCN 1318 can be communicatively coupled to a metadata management service 1352 (e.g., the metadata management system 1152 of FIG. 11) that can be communicatively coupled to public Internet 1354. Public Internet 1354 can be communicatively coupled to the NAT gateway 1338 contained in the control plane VCN 1316 and contained in the data plane VCN 1318. The service gateway 1336 contained in the control plane VCN 1316 and contained in the data plane VCN 1318 can be communicatively couple to cloud services 1356.

In some embodiments, the data plane VCN 1318 can be integrated with customer tenancies 1370. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane app tier 1346. Code to run the function may be executed in the VMs 1366(1)-(N), and the code may not be configured to run anywhere else on the data plane VCN 1318. Each VM 1366(1)-(N) may be connected to one customer tenancy 1370. Respective containers 1371(1)-(N) contained in the VMs 1366(1)-(N) may be configured to run the code. In this case, there can be a dual isolation (e.g., the containers 1371(1)-(N) running code, where the containers 1371(1)-(N) may be contained in at least the VM 1366(1)-(N) that are contained in the untrusted app subnet(s) 1362), which may help prevent incorrect or otherwise undesirable code from damaging the network of the IaaS provider or from damaging a network of a different customer. The containers 1371 (1)-(N) may be communicatively coupled to the customer tenancy 1370 and may be configured to transmit or receive data from the customer tenancy 1370. The containers 1371 (1)-(N) may not be configured to transmit or receive data from any other entity in the data plane VCN 1318. Upon completion of running the code, the IaaS provider may kill or otherwise dispose of the containers 1371(1)-(N).

In some embodiments, the trusted app subnet(s) 1360 may run code that may be owned or operated by the IaaS provider. In this embodiment, the trusted app subnet(s) 1360 may be communicatively coupled to the DB subnet(s) 1330 and be configured to execute CRUD operations in the DB subnet(s) 1330. The untrusted app subnet(s) 1362 may be communicatively coupled to the DB subnet(s) 1330, but in this embodiment, the untrusted app subnet(s) may be configured to execute read operations in the DB subnet(s) 1330. The containers 1371(1)-(N) that can be contained in the VM 1366(1)-(N) of each customer and that may run code from the customer may not be communicatively coupled with the DB subnet(s) 1330.

In other embodiments, the control plane VCN 1316 and the data plane VCN 1318 may not be directly communicatively coupled. In this embodiment, there may be no direct communication between the control plane VCN 1316 and the data plane VCN 1318. However, communication can occur indirectly through at least one method. An LPG 1310 may be established by the IaaS provider that can facilitate communication between the control plane VCN 1316 and the data plane VCN 1318. In another example, the control plane VCN 1316 or the data plane VCN 1318 can make a call to cloud services 1356 via the service gateway 1336. For example, a call to cloud services 1356 from the control plane VCN 1316 can include a request for a service that can communicate with the data plane VCN 1318.

Figure 14:
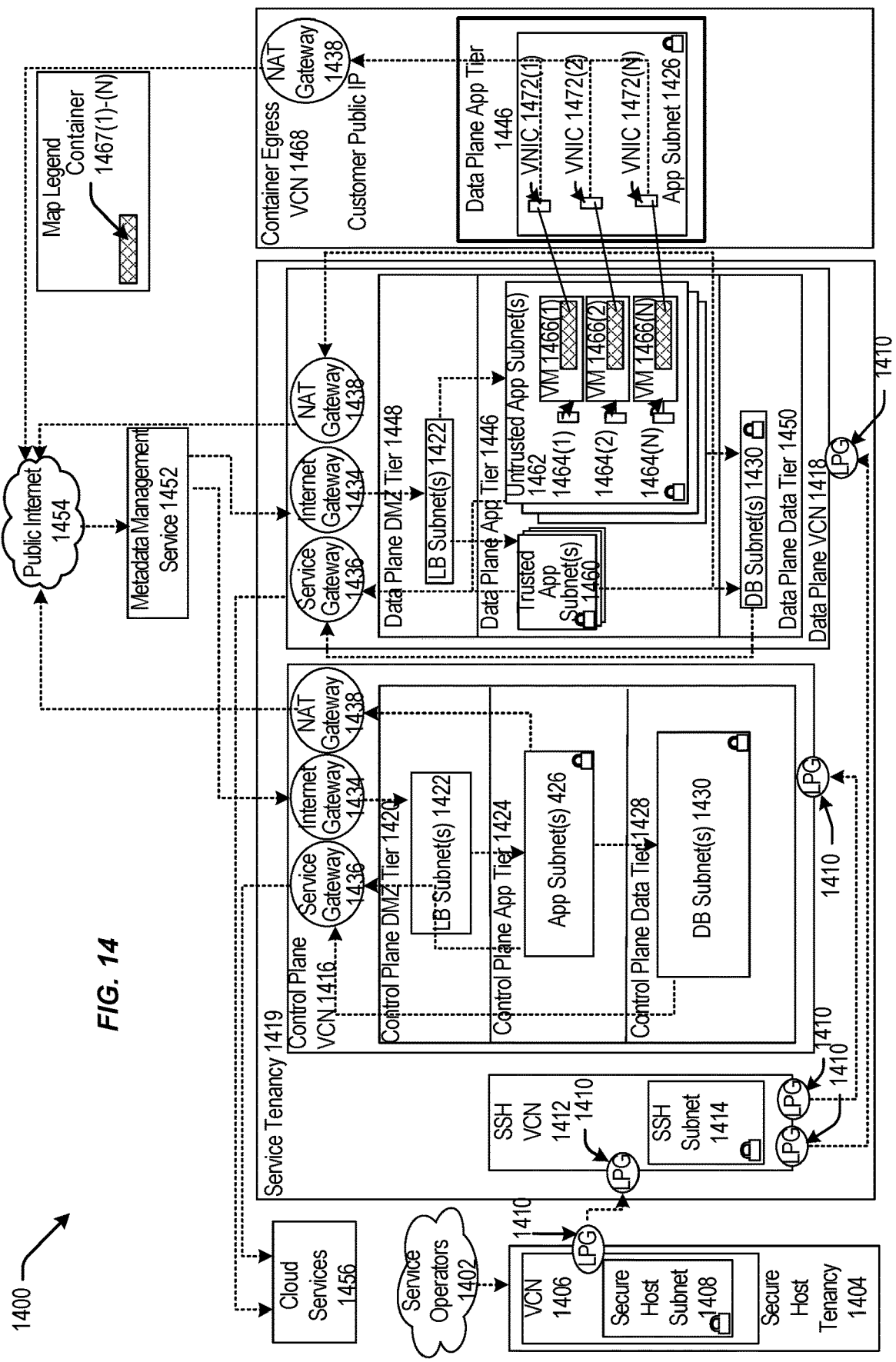
FIG. 14 is a block diagram illustrating another pattern for implementing a cloud infrastructure as a service system, according to at least one embodiment.

FIG. 14 is a block diagram 1400 illustrating another example pattern of an IaaS architecture, according to at least one embodiment. Service operators 1402 (e.g., service operators 1102 of FIG. 11) can be communicatively coupled to a secure host tenancy 1404 (e.g., the secure host tenancy 1104 of FIG. 11) that can include a virtual cloud network (VCN) 1406 (e.g., the VCN 1106 of FIG. 11) and a secure host subnet 1408 (e.g., the secure host subnet 1108 of FIG. 11). The VCN 1406 can include an LPG 1410 (e.g., the LPG 1110 of FIG. 11) that can be communicatively coupled to an SSH VCN 1412 (e.g., the SSH VCN 1112 of FIG. 11) via an LPG 1410 contained in the SSH VCN 1412. The SSH VCN 1412 can include an SSH subnet 1414 (e.g., the SSH subnet 1114 of FIG. 11), and the SSH VCN 1412 can be communicatively coupled to a control plane VCN 1416 (e.g., the control plane VCN 1116 of FIG. 11) via an LPG 1410 contained in the control plane VCN 1416 and to a data plane VCN 1418 (e.g., the data plane 1118 of FIG. 11) via an LPG 1410 contained in the data plane VCN 1418. The control plane VCN 1416 and the data plane VCN 1418 can be contained in a service tenancy 1419 (e.g., the service tenancy 1119 of FIG. 11).

The control plane VCN 1416 can include a control plane DMZ tier 1420 (e.g., the control plane DMZ tier 1120 of FIG. 11) that can include LB subnet(s) 1422 (e.g., LB subnet(s) 1122 of FIG. 11), a control plane app tier 1424 (e.g., the control plane app tier 1124 of FIG. 11) that can include app subnet(s) 1426 (e.g., app subnet(s) 1126 of FIG. 11), a control plane data tier 1428 (e.g., the control plane data tier 1128 of FIG. 11) that can include DB subnet(s) 1430 (e.g., DB subnet(s) 1330 of FIG. 13). The LB subnet(s) 1422 contained in the control plane DMZ tier 1420 can be communicatively coupled to the app subnet(s) 1426 contained in the control plane app tier 1424 and to an Internet gateway 1434 (e.g., the Internet gateway 1134 of FIG. 11) that can be contained in the control plane VCN 1416, and the app subnet(s) 1426 can be communicatively coupled to the DB subnet(s) 1430 contained in the control plane data tier 1428 and to a service gateway 1436 (e.g., the service gateway of FIG. 11) and a network address translation (NAT) gateway 1438 (e.g., the NAT gateway 1138 of FIG.

11). The control plane VCN 1416 can include the service gateway 1436 and the NAT gateway 1438.

The data plane VCN 1418 can include a data plane app tier 1446 (e.g., the data plane app tier 1146 of FIG. 11), a data plane DMZ tier 1448 (e.g., the data plane DMZ tier 1148 of FIG. 11), and a data plane data tier 1450 (e.g., the data plane data tier 1150 of FIG. 11). The data plane DMZ tier 1448 can include LB subnet(s) 1422 that can be communicatively coupled to trusted app subnet(s) 1460 (e.g., trusted app subnet(s) 1360 of FIG. 13) and untrusted app subnet(s) 1462 (e.g., untrusted app subnet(s) 1362 of FIG. 13) of the data plane app tier 1446 and the Internet gateway 1434 contained in the data plane VCN 1418. The trusted app subnet(s) 1460 can be communicatively coupled to the service gateway 1436 contained in the data plane VCN 1418, the NAT gateway 1438 contained in the data plane VCN 1418, and DB subnet(s) 1430 contained in the data plane data tier 1450. The untrusted app subnet(s) 1462 can be communicatively coupled to the service gateway 1436 contained in the data plane VCN 1418 and DB subnet(s) 1430 contained in the data plane data tier 1450. The data plane data tier 1450 can include DB subnet(s) 1430 that can be communicatively coupled to the service gateway 1436 contained in the data plane VCN 1418.

The untrusted app subnet(s) 1462 can include primary VNICs 1464(1)-(N) that can be communicatively coupled to tenant virtual machines (VMs) 1466(1)-(N) residing within the untrusted app subnet(s) 1462. Each tenant VM 1466(1)-(N) can run code in a respective container 1467(1)-(N), and be communicatively coupled to an app subnet 1426 that can be contained in a data plane app tier 1446 that can be contained in a container egress VCN 1468. Respective secondary VNICs 1472(1)-(N) can facilitate communication between the untrusted app subnet(s) 1462 contained in the data plane VCN 1418 and the app subnet contained in the container egress VCN 1468. The container egress VCN can include a NAT gateway 1438 that can be communicatively coupled to public Internet 1454 (e.g., public Internet 1154 of FIG. 11).

The Internet gateway 1434 contained in the control plane VCN 1416 and contained in the data plane VCN 1418 can be communicatively coupled to a metadata management service 1452 (e.g., the metadata management system 1152 of FIG. 11) that can be communicatively coupled to public Internet 1454. Public Internet 1454 can be communicatively coupled to the NAT gateway 1438 contained in the control plane VCN 1416 and contained in the data plane VCN 1418. The service gateway 1436 contained in the control plane VCN 1416 and contained in the data plane VCN 1418 can be communicatively couple to cloud services 1456.

In some examples, the pattern illustrated by the architecture of block diagram 1400 of FIG. 14 may be considered an exception to the pattern illustrated by the architecture of block diagram 1300 of FIG. 13 and may be desirable for a customer of the IaaS provider if the IaaS provider cannot directly communicate with the customer (e.g., a disconnected region). The respective containers 1467(1)-(N) that are contained in the VMs 1466(1)-(N) for each customer can be accessed in real-time by the customer. The containers 1467(1)-(N) may be configured to make calls to respective secondary VNICs 1472(1)-(N) contained in app subnet(s) 1426 of the data plane app tier 1446 that can be contained in the container egress VCN 1468. The secondary VNICs 1472(1)-(N) can transmit the calls to the NAT gateway 1438 that may transmit the calls to public Internet 1454. In this example, the containers 1467(1)-(N) that can be accessed in real-time by the customer can be isolated from the control plane VCN 1416 and can be isolated from other entities contained in the data plane VCN 1418. The containers 1467(1)-(N) may also be isolated from resources from other customers.

In other examples, the customer can use the containers 1467(1)-(N) to call cloud services 1456. In this example, the customer may run code in the containers 1467(1)-(N) that requests a service from cloud services 1456. The containers 1467(1)-(N) can transmit this request to the secondary VNICs 1472(1)-(N) that can transmit the request to the NAT gateway that can transmit the request to public Internet 1454. Public Internet 1454 can transmit the request to LB subnet(s) 1422 contained in the control plane VCN 1416 via the Internet gateway 1434. In response to determining the request is valid, the LB subnet(s) can transmit the request to app subnet(s) 1426 that can transmit the request to cloud services 1456 via the service gateway 1436.

It should be appreciated that IaaS architectures 1100, 1200, 1300, 1400 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 15:
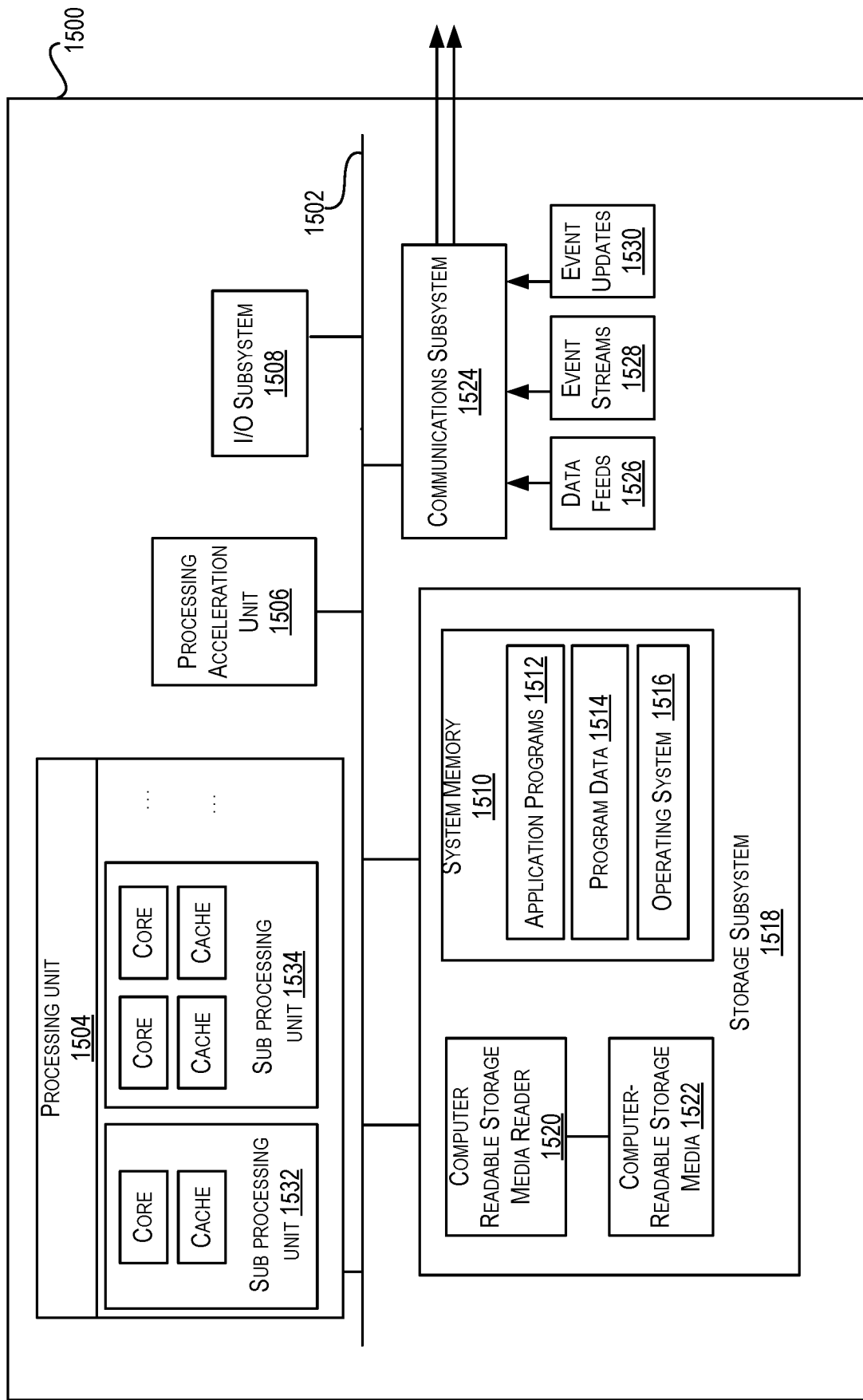
FIG. 15 is a block diagram illustrating an example computer system, according to at least one embodiment.

FIG. 15 illustrates an example computer system 1500, in which various embodiments may be implemented. The system 1500 may be used to implement any of the computer systems described above. As shown in the figure, computer system 1500 includes a processing unit 1504 that communicates with a number of peripheral subsystems via a bus subsystem 1502. These peripheral subsystems may include a processing acceleration unit 1506, an I/O subsystem 1508, a storage subsystem 1518 and a communications subsystem 1524. Storage subsystem 1518 includes tangible computer-readable storage media 1522 and a system memory 1510.

Bus subsystem 1502 provides a mechanism for letting the various components and subsystems of computer system 1500 communicate with each other as intended. Although bus subsystem 1502 is shown schematically as a single bus, alternative embodiments of the bus subsystem may utilize multiple buses. Bus subsystem 1502 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1504, which can be implemented as one or more integrated circuits (e.g., a conventional microprocessor or microcontroller), controls the operation of computer system 1500. One or more processors may be included in processing unit 1504. These processors may include single core or multicore processors. In certain embodiments, processing unit 1504 may be implemented as one or more independent processing units 1532 and/or 1534 with single or multicore processors included in each processing unit. In other embodiments, processing unit 1504 may also be implemented as a quad-core processing unit formed by integrating two dual-core processors into a single chip.

In various embodiments, processing unit 1504 can execute a variety of programs in response to program code and can maintain multiple concurrently executing programs or processes. At any given time, some or all of the program code to be executed can be resident in processor(s) 1504 and/or in storage subsystem 1518. Through suitable programming, processor(s) 1504 can provide various functionalities described above. Computer system 1500 may additionally include a processing acceleration unit 1506, which can include a digital signal processor (DSP), a special-purpose processor, and/or the like.

I/O subsystem 1508 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1500 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1500 may comprise a storage subsystem 1518 that provides a tangible non-transitory computer-readable storage medium for storing software and data constructs that provide the functionality of the embodiments described in this disclosure. The software can include programs, code modules, instructions, scripts, etc., that when executed by one or more cores or processors of processing unit 1504 provide the functionality described above. Storage subsystem 1518 may also provide a repository for storing data used in accordance with the present disclosure.

As depicted in the example in FIG. 15, storage subsystem 1518 can include various components including a system memory 1510, computer-readable storage media 1522, and a computer readable storage media reader 1520. System memory 1510 may store program instructions that are loadable and executable by processing unit 1504. System memory 1510 may also store data that is used during the execution of the instructions and/or data that is generated during the execution of the program instructions. Various different kinds of programs may be loaded into system memory 1510 including but not limited to client applications, Web browsers, mid-tier applications, relational database management systems (RDBMS), virtual machines, containers, etc.

System memory 1510 may also store an operating system 1516. Examples of operating system 1516 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, and Palm® OS operating systems. In certain implementations where computer system 1500 executes one or more virtual machines, the virtual machines along with their guest operating systems (GOSs) may be loaded into system memory 1510 and executed by one or more processors or cores of processing unit 1504.

System memory 1510 can come in different configurations depending upon the type of computer system 1500. For example, system memory 1510 may be volatile memory (such as random access memory (RAM)) and/or non-volatile memory (such as read-only memory (ROM), flash memory, etc.) Different types of RAM configurations may be provided including a static random access memory (SRAM), a dynamic random access memory (DRAM), and others. In some implementations, system memory 1510 may include a basic input/output system (BIOS) containing basic routines that help to transfer information between elements within computer system 1500, such as during start-up.

Computer-readable storage media 1522 may represent remote, local, fixed, and/or removable storage devices plus storage media for temporarily and/or more permanently containing, storing, computer-readable information for use by computer system 1500 including instructions executable by processing unit 1504 of computer system 1500.

Computer-readable storage media 1522 can include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media.

By way of example, computer-readable storage media 1522 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1522 may include, but is not limited to, Zip® drives, flash memory cards, universal serial bus (USB) flash drives, secure digital (SD) cards, DVD disks, digital video tape, and the like. Computer-readable storage media 1522 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1500.

Machine-readable instructions executable by one or more processors or cores of processing unit 1504 may be stored on a non-transitory computer-readable storage medium. A non-transitory computer-readable storage medium can include physically tangible memory or storage devices that include volatile memory storage devices and/or non-volatile storage devices. Examples of non-transitory computer-readable storage medium include magnetic storage media (e.g., disk or tapes), optical storage media (e.g., DVDs, CDs), various types of RAM, ROM, or flash memory, hard drives, floppy drives, detachable memory drives (e.g., USB drives), or other type of storage device.

Communications subsystem 1524 provides an interface to other computer systems and networks. Communications subsystem 1524 serves as an interface for receiving data from and transmitting data to other systems from computer system 1500. For example, communications subsystem 1524 may enable computer system 1500 to connect to one or more devices via the Internet. In some embodiments communications subsystem 1524 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1524 can provide wired network connectivity (e.g., Ethernet) in addition to or instead of a wireless interface.

In some embodiments, communications subsystem 1524 may also receive input communication in the form of structured and/or unstructured data feeds 1526, event streams 1528, event updates 1530, and the like on behalf of one or more users who may use computer system 1500.

By way of example, communications subsystem 1524 may be configured to receive data feeds 1526 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1524 may also be configured to receive data in the form of continuous data streams, which may include event streams 1528 of real-time events and/or event updates 1530, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 1524 may also be configured to output the structured and/or unstructured data feeds 1526, event streams 1528, event updates 1530, and the like to one or more databases that may be in communication with one or more streaming data source computers coupled to computer system 1500.

Computer system 1500 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1500 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments, but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A computer-implemented method, comprising:
   obtaining, by a resource identification service of a cloud-computing environment, a configuration file comprising resource discovery data associated with a service, the resource discovery data indicating a set of parameters with which a previously existing resource of the cloud-computing environment is to be identified;
   executing, by the resource identification service, operations to identify the previously existing resource, the previously existing resource being identified based at least in part on matching attributes associated with the previously existing resource to the set of parameters of the resource discovery data;
   identifying, by the resource identification service, a set of import operations to perform to obtain an identifier corresponding to the previously existing resource; and
   transmitting the identifier corresponding to the previously existing resource identified based at least in part on executing the set of import operations.

2. The computer-implemented method of claim 1, wherein the set of parameters comprises at least one of: a location to be searched for the previously existing resource or a value corresponding to an attribute of the previously existing resource.

3. The computer-implemented method of claim 1, wherein the identifier corresponding to the previously existing resource is transmitted to an orchestration service of the cloud-computing environment, and wherein transmitting the identifier to the orchestration service of the cloud-computing environment causes the previously existing resource to be utilized in a data center in lieu of generating a new resource.

4. The computer-implemented method of claim 1, wherein the previously existing resource includes at least one of: an infrastructure component, data, or an application.

5. The computer-implemented method of claim 1, wherein the set of import operations are identified from the configuration file.

6. The computer-implemented method of claim 1, further comprising:
   obtaining, by the resource identification service from the resource discovery data, a second set of parameters with which a second previously existing resource of the cloud-computing environment is to be identified;
   executing, by the resource identification service, additional operations to identify the second previously existing resource, the second previously existing resource being identified based at least in part on matching attributes associated with the second previously existing resource to the second set of parameters of the resource discovery data;
   identifying, by the resource identification service, a second set of import operations to perform to obtain a second identifier corresponding to the second previously existing resource; and
   providing, to a computing component, the second identifier corresponding to the second previously existing resource identified based at least in part on executing the second set of import operations.

7. The computer-implemented method of claim 1, further comprising:

executing the set of import operations, wherein executing the set of import operations causes the resource identification service to identify an address corresponding to a location of the previously existing resource or the identifier for the previously existing resource.

8. A computing device of a cloud-computing environment, comprising:
one or more processors; and
one or more memories storing computer-executable instructions that, when executed by the one or more processors, cause a resource identification service of the cloud-computing environment to:
obtain a configuration file comprising resource discovery data associated with a service, the resource discovery data indicating a set of parameters with which a previously existing resource of the cloud-computing environment is to be identified;
execute operations to identify the previously existing resource, the previously existing resource being identified based at least in part on matching attributes associated with the previously existing resource to the set of parameters of the resource discovery data;
identify a set of import operations to perform to obtain an identifier corresponding to the previously existing resource; and
transmit the identifier corresponding to the previously existing resource identified based at least in part on executing the set of import operations.

9. The computing device of claim 8, wherein the set of parameters comprises at least one of: a location to be searched for the previously existing resource or a value corresponding to an attribute of the previously existing resource.

10. The computing device of claim 8, wherein the identifier corresponding to the previously existing resource is transmitted to an orchestration service of the cloud-computing environment, and wherein transmitting the identifier to the orchestration service of the cloud-computing environment causes the previously existing resource to be utilized in a data center in lieu of generating a new resource.

11. The computing device of claim 8, wherein the previously existing resource includes at least one of: an infrastructure component, data, or an application.

12. The computing device of claim 8, wherein the set of import operations are identified from the configuration file.

13. The computing device of claim 8, wherein executing the operations further causes the resource identification service to:
obtain, from the resource discovery data, a second set of parameters with which a second previously existing resource of the cloud-computing environment is to be identified;
execute additional operations to identify the second previously existing resource, the second previously existing resource being identified based at least in part on matching attributes associated with the second previously existing resource to the second set of parameters of the resource discovery data;
identify a second set of import operations to perform to obtain a second identifier corresponding to the second previously existing resource; and
transmit the second identifier corresponding to the second previously existing resource identified based at least in part on executing the second set of import operations.

14. The computing device of claim 8, wherein executing the operations further causes the resource identification service to execute the set of import operations, wherein executing the set of import operations causes the resource identification service to identify an address corresponding to a location of the previously existing resource or the identifier for the previously existing resource.

15. A non-transitory computer-readable medium storing computer-executable instructions that, when executed by the one or more processors, cause a resource identification service of a cloud-computing environment to:
obtain a configuration file comprising resource discovery data associated with a service, the resource discovery data indicating a set of parameters with which a previously existing resource of the cloud-computing environment is to be identified;
execute operations to identify the previously existing resource, the previously existing resource being identified based at least in part on matching attributes associated with the previously existing resource to the set of parameters of the resource discovery data;
identify a set of import operations to perform to obtain an identifier corresponding to the previously existing resource; and
transmit the identifier corresponding to the previously existing resource identified based at least in part on executing the set of import operations.

16. The non-transitory computer-readable medium of claim 15, wherein the set of parameters comprises at least one of: a location to be searched for the previously existing resource or a value corresponding to an attribute of the previously existing resource.

17. The non-transitory computer-readable medium of claim 15, wherein the identifier corresponding to the previously existing resource is transmitted to an orchestration service of the cloud-computing environment, and wherein transmitting the identifier to the orchestration service of the cloud-computing environment causes the previously existing resource to be utilized in a data center in lieu of generating a new resource.

18. The non-transitory computer-readable medium of claim 15, wherein the set of import operations are identified from the configuration file.

19. The non-transitory computer-readable medium of claim 15, wherein executing the operations further causes the resource identification service to:
obtain, from the resource discovery data, a second set of parameters with which a second previously existing resource of the cloud-computing environment is to be identified;
execute additional operations to identify the second previously existing resource, the second previously existing resource being identified based at least in part on matching attributes associated with the second previously existing resource to the second set of parameters of the resource discovery data;
identify a second set of import operations to perform to obtain a second identifier corresponding to the second previously existing resource; and
transmit the second identifier corresponding to the second previously existing resource identified based at least in part on executing the second set of import operations.

20. The non-transitory computer-readable medium claim 15, wherein executing the operations further causes the resource identification service to execute the set of import operations, wherein executing the set of import operations causes the resource identification service to identify an address corresponding to a location of the previously existing resource or the identifier for the previously existing resource.

* * * * *

UNITED STATES PATENT AND TRADEMARK OFFICE
CERTIFICATE OF CORRECTION

| | |
|---|---|
| PATENT NO. | : 11,736,579 B1 |
| APPLICATION NO. | : 18/078883 |
| DATED | : August 22, 2023 |
| INVENTOR(S) | : Miller et al. |

It is certified that error appears in the above-identified patent and that said Letters Patent is hereby corrected as shown below:

In the Specification

In Column 9, Line 56, delete "DistributorDistributor"" and insert -- Distributor" --, therefor.

In Column 15, Line 21, delete "Regionalmay" and insert -- Regional may --, therefor.

In Column 15, Line 25, delete "bootratpped" and insert -- bootstrapped --, therefor.

In Column 16, Line 37, delete "identifier)." and insert -- identifier), --, therefor.

In Column 17, Line 12, delete "protion" and insert -- portion --, therefor.

In Column 19, Line 57, delete "FIG." and insert -- FIGS. --, therefor.

In Column 20, Line 16, delete "FIG." and insert -- FIGS. --, therefor.

In Column 21, Line 37, delete "namd" and insert -- name --, therefor.

In Column 21, Line 42, delete "decpited," and insert -- depicted, --, therefor.

In Column 22, Line 33, delete "FIG." and insert -- FIGS. --, therefor.

In Column 22, Line 43, delete "FIG." and insert -- FIGS. --, therefor.

In Column 41, Line 49, delete "evolution)," and insert -- evolution)), --, therefor.

In the Claims

In Column 46, Line 63, in Claim 20, delete "claim" and insert -- of claim --, therefor.

Signed and Sealed this
Twenty-second Day of October, 2024

Katherine Kelly Vidal
*Director of the United States Patent and Trademark Office*